(12) United States Patent
Spohrer

(10) Patent No.: US 12,401,749 B2
(45) Date of Patent: *Aug. 26, 2025

(54) METHOD AND SYSTEM FOR VIRTUAL ASSISTANT CONVERSATIONS

(71) Applicant: Verint Americas Inc., Alpharetta, GA (US)

(72) Inventor: Daniel Thomas Spohrer, Alpharetta, GA (US)

(73) Assignee: Verint Americas Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/511,563

(22) Filed: Nov. 16, 2023

(65) Prior Publication Data

US 2024/0089375 A1 Mar. 14, 2024

Related U.S. Application Data

(63) Continuation of application No. 17/543,036, filed on Dec. 6, 2021, now Pat. No. 11,825,023, which is a continuation of application No. 16/662,777, filed on Oct. 24, 2019, now Pat. No. 11,196,863.

(60) Provisional application No. 62/749,836, filed on Oct. 24, 2018.

(51) Int. Cl.
| | | |
|---|---|---|
| *H04M 3/51* | (2006.01) | |
| *G06F 3/16* | (2006.01) | |
| *G06N 5/043* | (2023.01) | |
| *G10L 15/22* | (2006.01) | |

(52) U.S. Cl.
CPC .......... *H04M 3/5191* (2013.01); *G06F 3/167* (2013.01); *G06N 5/043* (2013.01); *G10L 15/22* (2013.01); *H04M 3/5166* (2013.01); *H04M 3/5175* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 2014/0270109 A1* | 9/2014 | Riahi | G06N 20/00 379/88.01 |
| 2016/0048438 A1* | 2/2016 | Martos | G06F 11/1417 714/33 |
| 2017/0032027 A1* | 2/2017 | Mauro | H04M 3/5191 |
| 2019/0057698 A1* | 2/2019 | Raanani | H04M 3/22 |

* cited by examiner

*Primary Examiner* — Quynh H Nguyen
(74) *Attorney, Agent, or Firm* — Meunier Carlin & Curfman LLC

(57) ABSTRACT

Techniques and architectures for implementing a team of virtual assistants are described herein. The team may include multiple virtual assistants that are configured with different characteristics, such as different functionality, base language models, levels of training, visual appearances, personalities, and so on. The characteristics of the virtual assistants may be configured by trainers, end-users, and/or a virtual assistant service. The virtual assistants may be presented to end-users in conversation user interfaces to perform different tasks for the users in a conversational manner. The different virtual assistants may adapt to different contexts. The virtual assistants may additionally, or alternatively, interact with each other to carry out tasks for the users, which may be illustrated in conversation user interfaces.

17 Claims, 23 Drawing Sheets

METHOD AND SYSTEM FOR VIRTUAL ASSISTANT CONVERSATIONS

RELATED APPLICATIONS

This application claims priority to and incorporates by references U.S. Provisional Patent Application Ser. No. 62/749,836 filed on Oct. 24, 2018 and entitled Method and System for Virtual Assistant Conversations.

BACKGROUND

A growing number of people are using smart devices, such as smart phones, tablet computers, laptop computers, and so on, to perform a variety of functionality. In many instances, the users interact with their devices through a virtual assistant. The virtual assistant may communicate with a user to perform a desired service or task, such as searching for content, checking-in to a flight, setting a calendar appointment, and so on. As more users interact with smart devices through a virtual assistant, there is an increasing need to enhance the user's experience with the virtual assistant.

In some circumstances, however, users prefer to interact with a human being when conducting transactions in electronic commerce or other personal business. Accordingly, enterprises with customer-facing agents have faced challenges in meeting demands on man power in live agent contact centers receiving communications from customers by telephone, chat programs, emails, and the like. Accordingly, business sectors with high volume customer interactions consistently search for methods to encourage automated self-service that avoids the overwhelming use of human/live-agent communications. Artificial intelligence, such as that employed in artificial intelligence robots that accommodate human-machine interaction, has played an important role in developing such automated self-service systems.

As more background regarding the problem which this disclosure addresses, it is important to understand that one of the problems with self-service artificial intelligence robots, commonly called "AI bots," in the contact center industry is low adoption by customers that call into an assistance center. Customers are unaware, or unwilling to explore, what AI-assisted service can be achieved with a bot, especially in the voice channel. Customers typically do not engage a robot and will quickly find how to get the call routed to a live agent. But with the growth of artificial intelligence, bots are becoming much more capable in natural language understanding. Anyone who has put Amazon's Alexa in their home has quickly learned through curiosity-led discovery that Alexa is quite capable of performing a lot of tasks and answering questions. So the challenge in the contact center industry is how to drive adoption of self-service an organization offers through AI bots?

One of the exciting trends in the contact center industry is the use of artificial intelligence robots ("AI bots") that can be used to both deliver better self-service to a customer (i.e. a customer can get help engaging an AI chat/voice bot directly through natural language), or, an AI bot can listen to the communication between a customer and a contact center agent silently and deliver agent assisted guidance during a call (i.e., AI bot listens to the caller in real-time and offers the agent guidance through next best action to the agent's computer screen transparent to the customer).

Also in the industry, there is a flurry of activity around voice activated personal assistants that individuals already use at home such as Amazon's Alexa and Google Home. These kinds of assistants are now entering the enterprise space (e.g. "Alexa, schedule a conference room at a time that fits our calendars").

A need currently exists in the enterprise space for a system that combines two emerging paradigms—virtual assistants via AI bots and voice activated, command driven virtual assistant programs for use by consumers. In one non-limiting example, the disclosure herein addresses this technology combination in the context of customer assistance via a live contact center environment. Utilizing the voice channel along with a live contact center agent to leverage the capabilities of AI bots with voice activated command features provides a new way of teaching customers the benefits and efficiencies in automated service options in the voice data channel.

SUMMARY OF THE EMBODIMENTS

In the proposed embodiments here, a system addresses these two needs with the following—when a customer is engaged with an Agent in the voice channel, the Bot can be called upon by the Agent "in the first person" and respond to the agent's needs on demand. This would happen in direct visibility with the customer; i.e. the bot is another party to their call.

Example: The customer wants to know if they can setup a reoccurring monthly transfer of $100 between her checking account and savings account. The Agent responds to the customer and then engages the bot, "Sure. Alexa, please setup a transfer of $100 for Ms. Jones between her checking account and savings account at the first of every month". Alexa verbally confirms the action to both the customer and the agent.

There are two benefits here—it obviously reduces the average handle time of the call due to less manual steps by the agent. But more interestingly—the customer has just observed that the Bank ABC's AI Bot, named Alexa has the capability of performing such complex transactions—this will increase the likelihood that the customer will engage the bot in the self-service channel for similar needs in the future.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
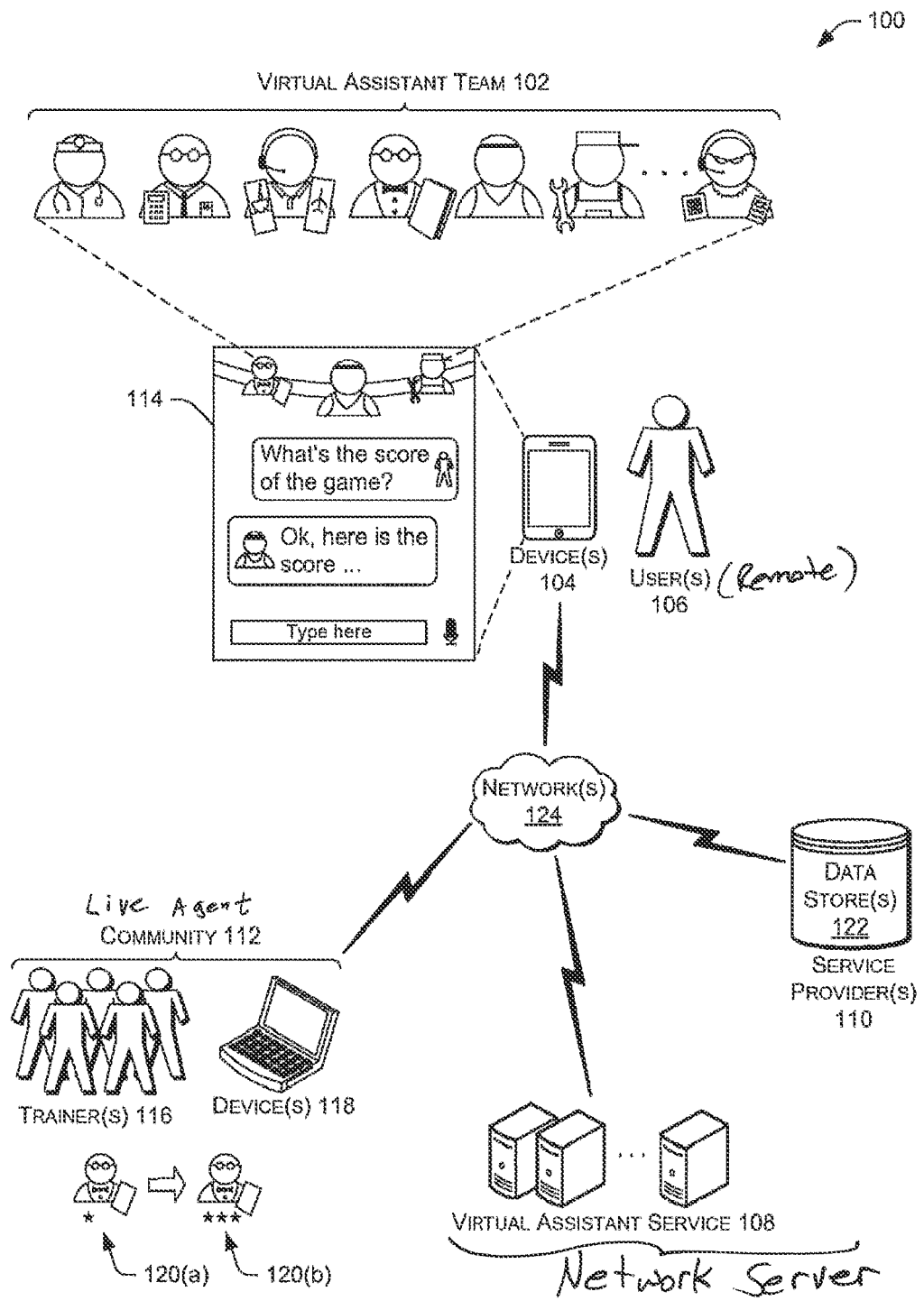
FIG. 1 illustrates an example architecture in which techniques described herein may be implemented.

This disclosure describes, in part, techniques and architectures for implementing a team of virtual assistants. The team may include multiple virtual assistants that are configured with different characteristics, such as different functionality, base language models, levels of training, visual appearances, personalities, and so on. The characteristics of the virtual assistants may be configured by trainers, end-users, and/or a virtual assistant service. The virtual assistants may be presented to end-users in conversation user interfaces to perform different tasks for the users in a conversational manner. The different virtual assistants may adapt to different contexts (e.g., conversation context, location of the user, content that is output, calendar events, etc.). The virtual assistants may additionally, or alternatively, interact with each other to carry out tasks for the users, which may be illustrated in conversation user interfaces.

In some implementations, a virtual assistant service may provide a variety of tools to enable end-users, trainers, and others to connect with and/or use a team of virtual assistants. The virtual assistant service may provide a virtual assistant trainer interface to trainers in order to build characteristics of the virtual assistants. In some instances, a trainer may identify a virtual assistant through the trainer interface and interact with the virtual assistant over a period of time to teach the virtual assistant how to interact with users. In other instances, a trainer may provide input directly through the trainer interface to configure characteristics of a virtual assistant, such as configuring responses that should be provided for particular types of input, configuring tasks that should be performed, and so on. In yet further instances, a trainer may otherwise provide input to train a virtual assistant.

The virtual assistant service may also provide a virtual assistant agency interface to offer virtual assistants for acquisition to end-users. The agency interface may present different types of virtual assistants, such as virtual assistants that include different visual and/or functional characteristics. The virtual assistants may have been configured by trainers, the virtual assistant service, or otherwise. To illustrate, the agency interface may present a sports virtual assistant configured to provide sports functionality (e.g., answer sports questions, emulate a sports announcer, etc.), a doctor virtual assistant configured to provide medical functionality (e.g., offer medical advice, set medical appointments, etc.), a mechanic virtual assistant configured to provide automotive functionality (e.g., diagnose a problem with a car, manage maintenance schedules, etc.), and so on.

Further, the virtual assistant service may enable end-users to customize a team of virtual assistants. For example, end-users may enable or disable individual virtual assistants to be presented through a conversation user interface. The virtual assistants may be from a set of default virtual assistants that are available or a set of virtual assistants that have been acquired. In another example, end-users may modify or otherwise personalize a characteristic of a virtual assistant, such as a visual appearance, an accent, a data source, and so on.

The virtual assistant service may also manage how virtual assistants are output to end-users. As noted above, a virtual assistant may be presented through a conversation user interface that presents icons and other information. During a conversation with an end-user, different virtual assistants may be provided to the user, creating a rich user experience that adapts to different contexts. For example, if the user is speaking with a health virtual assistant and asks "what happened in the game last night?," the conversation user interface may be updated to present a sports virtual assistant to respond "The game was amazing! The wolves won in double overtime." In another example, if the user is watching a movie and switches to the conversation user interface, an entertainment virtual assistant may be presented to provide entertainment functionality, such as searching movie listings, providing movie recommendations, etc.

Further, the virtual assistant service may enable virtual assistants to communicate with each other to carry out tasks. These conversations may be illustrated in conversation user interfaces to inform users of what has occurred between the virtual assistants. In one example, a secretary virtual assistant of a user may communicate with a secretary virtual assistant of another user to schedule a meeting. To do so, the virtual assistants may share information with each other about availability of the users. This interaction between the virtual assistants may be presented to the users in conversation user interfaces, in a similar fashion as when the users converse with the virtual assistants. In another example, different virtual assistants of a same user may communicate to perform a task for the user (e.g., a tax virtual assistant may communicate with a banking virtual assistant to obtain financial information).

As this discussion highlights, the techniques and architectures described herein provide valuable resources to end-users, trainers, and others. In some instances, a virtual assistant service may provide a team of virtual assistants with different characteristics. The characteristics may be configured by trainers, end-users, the virtual assistant service, and others to provide customized virtual assistants. The team of virtual assistants may be selectively presented to end-users to adapt to different contexts, thereby providing a rich user experience. While this discussion herein highlights a few example tools, it is to be appreciated that the techniques and architectures may include a multitude of other tools that similarly provide value to end-users, trainers, and others.

Although many examples are described herein in the context of visually displayed user interfaces, these techniques may be implemented with audible user interfaces (e.g., presented through a speaker of a smart device) or other types of interfaces. Further, while the example virtual assistant teams described herein include particular virtual assistants, the virtual assistant teams may include any type or number of virtual assistants. Moreover, the techniques described herein may be performed, at least in part, by a virtual assistant service, that may be implemented at a client device and/or a remote computing device.

This brief introduction is provided for the reader's convenience and is not intended to limit the scope of the claims, nor the proceeding sections. Furthermore, the techniques described in detail herein may be implemented in a number of ways and in a number of contexts. Some example implementations and contexts are provided with reference to the following figures, as described below in more detail. It is to be appreciated, however, that the following implementations and contexts are but some of many.

Example Architecture

FIG. 1 illustrates an example architecture 100 in which a virtual assistant team 102 may be implemented. The architecture 100 includes one or more smart devices 104 (hereinafter "the smart device 104") to present the virtual assistant team 102 to one or more end-users 106 (hereinafter "the user 106") to perform tasks for the user 106. The virtual assistant team 102 may be implemented in cooperation with a virtual assistant service 108 that generally manages access to and/or functionality associated with the virtual assistant team 102. As the virtual assistant team 102 performs tasks, the virtual assistant team 102 may communicate with one or more services providers 110 (hereinafter "the service provider 110"). The architecture 100 also includes a virtual assistant trainer community 112 to train virtual assistants to be provided end-users, such as the user 106.

The smart device 104 may comprise any type of computing device that is configured to perform an operation. For example, the smart device 104 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a watch, a pair of glass with computing capabilities, etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on.

The smart device 104 may output the virtual assistant team 102 to the user 106 via a conversation user interface 114. The virtual assistant team 102 may interact with the user 106 in a conversational manner to perform tasks. For example, in response to a query from the user 106 to "find the nearest restaurant," a virtual assistant of the team 102 may provide information through the conversation user interface 114 that identifies the nearest restaurant. As such, the user 106 and/or the virtual assistant team 102 may communicate in a natural language format. Each virtual assistant of the virtual assistant team 102 may be configured for multi-modal input/output (e.g., receive and/or respond in audio or speech, text, touch, gesture, etc.), multi-language communication (e.g., receive and/or respond according to any type of human language), multi-channel communication (e.g., carry out conversations through a variety of computing devices, such as continuing a conversation as a user transitions from using one computing device to another), and other types of input/output or communication.

In some implementations, a virtual assistant may comprise an intelligent personal assistant. A virtual assistant may generally perform tasks for users and act as an interface to information of the service provider 110, information of the smart device 104, information of the virtual assistant service 108, or any type of information. For example, in response to input from the user 106, a virtual assistant may access content items stored on the service provider 110 and provide a content item to the user.

Further, in some implementations a virtual assistant may embody a human-like persona and/or artificial intelligence (AI). For example, a virtual assistant may be represented by an image or avatar that is displayed on the smart device 104. An avatar may comprise an animated character that may take on any number of shapes and appearances, and/or resemble a human talking to a user. In some instances, the avatar may be arranged as a representative of the service provider 110 or the virtual assistant service 108, while in other instances the avatar may be a dedicated personal assistant to a user.

The virtual assistant team 102 may include virtual assistants that are configured with different functional and/or visual characteristics. These different characteristics may enable the virtual assistant team 102 to adapt to various contexts, such as location of the smart device 104, concepts identified during a conversation, content that is being viewed by the user 106, calendar events, and so on. To illustrate, if the user 106 is interacting with a mechanical virtual assistant through the conversation user interface 114 and inputs "what's the score of the game," the conversation user interface 114 may change to a sports virtual assistant to provide the score of the game. In the example architecture 100 of FIG. 1, the virtual assistant team 102 includes a doctor virtual assistant, finance virtual assistant, travel agent virtual assistant, professor virtual assistant, sports virtual assistant, mechanic virtual assistant, and executive assistant virtual assistant. However, any type of virtual assistant may be implemented.

In some instances, the conversation user interface 114 is a dedicated interface for the smart device 104 (e.g., built into an operating system of the smart device 104, a mobile application for a mobile device, etc.). In other instances, the conversation user interface 114 is associated with the service provider 110 and/or the virtual assistant service 108. To illustrate, the conversation user interface 114 may be displayed through an online site of a service provider when the user navigates to the online site. Here, the conversation user interface 114 may include a virtual assistant that embodies characteristics of the service provider, such as a flight attendant for an online airline site.

The virtual assistant team 102 may be implemented in cooperation with the virtual assistant service 108. The virtual assistant service 108 may include one or more computing devices. The one or more computing devices may be implemented as one or more desktop computers, laptop computers, servers, and so on. The one or more computing devices may be configured in a cluster, data center, cloud computing environment, or a combination thereof. In one example, the virtual assistant service 108 provides cloud computing resources, including computational resources, storage resources, networking resources, and the like, that operate remotely to the smart device 104 or other devices.

The virtual assistant service 108 may provide one or more services to implement the virtual assistant team 102. As noted above, the virtual assistant service 108 may generally manage access to and/or functionality associated with the virtual assistant team 102. In one example, the virtual assistant service 108 may configure characteristics of a virtual assistant based on input from a trainer, user, or otherwise. In another example, the virtual assistant service 108 may cause different virtual assistants to be presented to end-users to perform a variety of tasks. In yet other examples, the virtual assistant service 108 may offer the virtual assistants for acquisition, associate virtual assistants with end-users so that they may be utilized by the end-users, and perform a variety of other functions described herein. The virtual assistant service 108 may operate as a "back-end" resource to the smart device 104 or other devices.

The virtual assistant trainer community 112 may include one or more trainers 116 (hereinafter "the trainer 116") that employ one or more devices 118 (hereinafter "the device 118") to train virtual assistants. In one example, the trainer 116 may select a virtual assistant to train from a set of default virtual assistants that are provided by the virtual assistant service 108. The trainer 116 may then interact with the virtual assistant over time to cause the virtual assistant to perform tasks. The virtual assistant service 108 may monitor the interactions and make updates to characteristics of the virtual assistant. To illustrate, assume that the trainer 116 provides input "what's the hoops score?" to a sports virtual assistant, and the sports virtual assistant provides search results for a hula hoop (e.g., since the term hoop is not yet associated with basketball). Here, the trainer 116 may state "no, I meant 'what's the score of the basketball game,'" and the term "hoops" may be reconfigured to be mapped to tasks associated with basketball. In another example, the trainer 116 may directly configure a characteristic through an interface that is provided by the virtual assistant service 108, such as selecting the term "hoops" to be associated with basketball tasks. In FIG. 1, the trainer 116 has updated a virtual assistant 120(*a*) to be a trained virtual assistant 120(*b*), as illustrated by the one star that is associated with the virtual assistant 120(*a*) and the three stars that are associated with the trained virtual assistant 120(*b*).

In some instances, the trainer 116 may be associated with particular qualifications. That is, the trainer 116 may include particular training, experience, skills, credentials, knowledge, and so on. The qualifications of the trainer 116 may be verified by the virtual assistant service 108 before the trainer 116 is able to train a virtual assistant. This verification may include evaluating documents that are provided by the trainer 116 (e.g., evaluating certificates or other documents uploaded by the trainer 116), performing a background check (e.g., with the explicit authorization from the trainer 116), searching online for information about the trainer 116 (e.g., information on social networking sites, etc.), and so on. In other instances, the trainer 116 may comprise any user that has registered with the virtual assistant service 108 as a trainer. Trainers may attempt to build reputations by training virtual assistants and receiving feedback from end-users regarding the virtual assistants.

The device 118 may include any type of computing device that is configured to perform an operation. For example, the device 118 may be implemented as a laptop computer, a desktop computer, a server, a smart phone, an electronic reader device, a mobile handset, a personal digital assistant (PDA), a portable navigation device, a portable gaming device, a tablet computer, a wearable computer (e.g., a watch, a pair of glass with computing capabilities, etc.), a portable media player, a television, a set-top box, a computer system in a car, an appliance, a camera, a robot, a hologram system, a security system, a home-based computer system (e.g., intercom system, home media system, etc.), a projector, an automated teller machine (ATM), and so on. As such, the device 118 may comprise a smart device.

The virtual assistant service 108 may communicate with the service provider 110 to access data and/or utilize services in order to implement the virtual assistant team 102. The service provider 110 may include one or more data stores 122 for storing content items. For example, the one or more data stores 122 may include a mobile web data store, a smart web data store, an information and content data store, a content management service (CMS) data store, and so on. A mobile web data store may store content items that are designed to be viewed on a mobile device, such as a mobile telephone, tablet device, etc. Meanwhile, a web data store includes content items that are generally designed to be viewed on a device that includes a relatively large display, such as a desktop computer. An information and content data store may include content items associated with an application, content items from a data base, and so on. A CMS data store may include content items providing information about a user, such as a user preference, user profile information, information identifying offers that are configured to a user based on profile and purchase preferences, etc. As such, the service provider 110 may include content items from any type of source.

Although the one or more data stores 122 are illustrated as included in the service provider 110, the one or more data stores 122 may alternatively, or additionally, be included in the virtual assistant service 108, the smart device 104, and/or the device 118. Further, although the service provider 110 is illustrated as a collection of the one or more data stores 122, the service provider 110 may be associated with one or more computing devices, such as one or more servers, desktop computers, laptop computers, or any other type of device configured to process data. In some instances, the one or more computing devices may be configured in a cluster, data center, cloud computing environment, or a combination thereof.

The architecture 100 may also include one or more networks 124 to enable the smart device 104, the virtual assistant service 108, the virtual assistant trainer community 112 (e.g., the device 118), and/or the service provider 110 to communicate with each other. The one or more networks 124 may include any one or combination of multiple different types of networks, such as cellular networks, wireless networks, Local Area Networks (LANs), Wide Area Networks (WANs), the Internet, and so on.

Example Virtual Assistant Service

Figure 2:
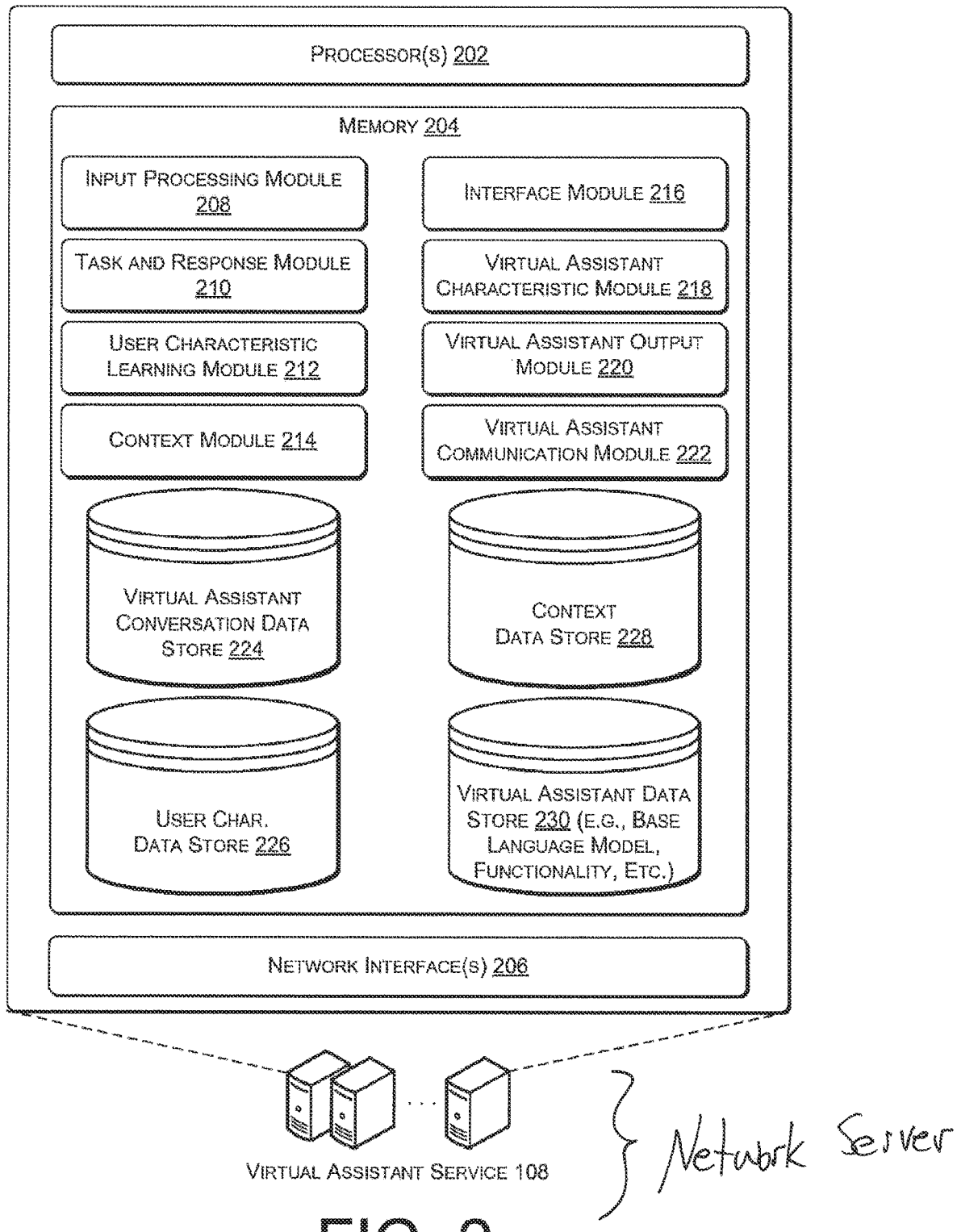
FIG. 2 illustrates example details of a virtual assistant service.

FIG. 2 illustrates details of the example virtual assistant service 108 of FIG. 1. As noted above, the virtual assistant service 108 may be implemented as one or more computing devices. The one or more computing devices may include one or more processors 202, memory 204, and one or more network interfaces 206. The one or more processors 202 may include a central processing unit (CPU), a graphics processing unit (GPU), a microprocessor, a digital signal processor, and so on.

The memory 204 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc.

As illustrated in FIG. 2, the memory 204 includes an input processing module 208, a task and response module 210, a user characteristic learning module 212, a context module 214, an interface module 216, a virtual assistant characteristic module 218, a virtual assistant output module 220, and a virtual assistant communication module 222.

The input processing module 208 may be configured to perform various techniques to process input received from a user. For instance, input that is received from the user 106 during a conversation with a virtual assistant may be sent to the input processing module 208 for processing. If the input is speech input, the input processing module 208 may perform speech recognition techniques to convert the input into a format that is understandable by a computing device, such as text. Additionally, or alternatively, the input processing module 208 may utilize Natural Language Processing (NLP) to interpret or derive a meaning and/or concept of the input. The speech recognition and/or NLP techniques may include known or new techniques.

The task and response module 210 may be configured to identify and/or perform tasks and/or formulate a response to input. As noted above, users may interact with virtual assistants to cause tasks to be performed by the virtual assistants. In some instances, a task may be performed in response to explicit user input, such as playing music in response to "please play music." In other instances, a task may be performed in response to inferred user input requesting that that the task be performed, such as providing weather information in response to "the weather looks nice today." In yet further instances, a task may be performed when an event has occurred (and possibly when no input has been received), such as providing flight information an hour before a flight, presenting flight information upon arrival of a user at an airport, and so on.

A task may include any type of operation that is performed at least in part by a computing device. For example, a task may include logging a user into a site, setting a calendar appointment, resetting a password for a user, purchasing an item, opening an application, sending an instruction to a device to perform an act, sending an email, navigating to a web site, upgrading a user's seat assignment, outputting content (e.g., outputting audio (an audible answer), video, an image, text, a hyperlink, etc.), and so on. Further, a task may include performing an operation according to one or more criteria (e.g., one or more default settings), such as sending an email through a particular email account, providing directions with a particular mobile application, searching for content through a particular search engine, and so on.

A task may include or be associated with a response to a user (e.g., "here is your requested information," outputting content, etc.). A response may be provided through a conversation user interface associated with a virtual assistant. In some instances, a response may be addressed to or otherwise tailored to a user (e.g., "Yes, John, as a Gold Customer you are entitled to a seat upgrade, and I have provided some links below that may be of interest to you . . . "). Input and/or output between users and virtual assistants (e.g., conversations) may be stored in a virtual assistant conversation data store 224.

The user characteristic learning module 212 may be configured to observe user activity and attempt to learn characteristics about a user. The user characteristic learning module 212 may learn any number of characteristics about the user over time, such as user preferences (e.g., likes and dislikes), track patterns (e.g., user normally reads the news starting with the sports, followed by the business section, followed by the world news), behaviors (e.g., listens to music in the morning and watches movies at night, speaks with an accent, prefers own music collection rather than looking for new music in the cloud, etc.), and so on. To observe user activity and learn a characteristic, the user characteristic learning module 212 may access a user profile, track a pattern, monitor navigation of the user, and so on. Learned user characteristics may be stored in a user characteristic data store 226.

As an example of learning a user characteristic, consider a scenario where a user incorrectly inputs "Cobo" or a speech recognition system incorrectly recognized the user input as "Cobo". Once the user corrects this to say "Cabo", the user characteristic learning module 212 can record this correction from "Cobo" to "Cabo" in the event that a similar situation arises in the future. Thus, when the user next speaks the phrase "Cabo San Lucas", and even though the speech recognition might recognize the user input as "Cobo", the virtual assistant service 108 will use the learned correction and make a new assumption that the user means "Cabo" and respond accordingly. As another example, if a user routinely asks for the movie "Crazy", the user characteristic learning module 212 will learn over time that this is the user preference and make this assumption. Hence, in the future, when the user says "Play Crazy", the virtual assistant service 108 will make a different initial assumption to begin play of the movie, rather than the original assumption of the song "Crazy" by Willie Nelson.

The context module 214 may be configured to identify (e.g., determine) one or more pieces of contextual information. Contextual information may be used in various manners. For instance, contextual information may be used by the input processing module 208 to determine an intent or meaning of a user's input. In addition, after identifying the user's intent, the same or different contextual information may be taken into account by the task and response module 210 to determine a task to be performed or a response to provide back to the user. Further, contextual information may be used by the user characteristic learning module 212 to learn characteristics about a user. Moreover, contextual information may be used by the virtual assistant characteristic module 218 to customize a virtual assistant team. Additionally, or alternatively, contextual information may be used by the virtual assistant output module 220 to manage output of virtual assistants to users and/or by the virtual assistant communication module 222 to control conversations between virtual assistants.

Generally, contextual information may comprise any type of information that is associated with a user, a device, or other information. In some instances, contextual information is expressed as a value of one or more variables, such as whether or not a user has signed in with a site (e.g., "is_signed_in=true" or "is_signed_in=false"). When contextual information is associated with a user, the contextual information may be obtained with the explicit consent of the user (e.g., asking the user if the information may be collected). Contextual information may be stored in a context data store 228. Example, non-limiting pieces of contextual information may include:

a) Conversation information describing a conversation between a user and a virtual assistant, either during the current session or during a previous session(s) (e.g., a conversation history (input and/or output) during a current or previous conversation session). For example, the conversation information may include the input that is received from a user (e.g., "what is the weather like outside") and/or the output from a virtual assistant (e.g., "it's 40 degrees outside").

b) Content output history describing content that has been output to a user during a conversation or at any time. For example, the output history may indicate that a sports web page was output to a user during a conversation. In another example, the output history may identify a song that a user listened to on a home stereo receiver or a movie that was played on a television.

c) Input mode history indicating one or more input modes that a user has used to interact with a user interface (e.g., text, touch, or speech input via a conversation user interface of a virtual assistant and/or another user interface).

d) What type of input mode a user prefers to interact with a virtual assistant (e.g., input mode—whether the user prefers to submit a query textually, using voice input, touch input, gesture input, etc.). A preferred input mode may be inferred from previous interactions, explicit input of the user, profile information, etc.

e) Calendar information describing one or more events of a user (e.g., a scheduled flight, a work meeting, etc.).

f) Message information describing a message that has been sent via a messaging service (e.g., a text message, an email, an instant messaging message, a telephone call, etc.). The messaging information may identify the content of the message, who the message was sent to, from whom the message was sent, etc.

g) A location of a cursor on a site when a user provides input to a virtual assistant.

h) A time of day or date (e.g., a time of day at which a user provides input to a virtual assistant).

i) An age or gender of a user.

j) Location information describing a previous, current, or future location of a user or device associated with the user (e.g., a geo-location of a device through which the user provides a query, location based on network information, mailing address of the user, etc.).

k) Sensor information obtained from a sensor of a device with which a user is interacting (e.g., a geo-location, environmental data including background noise or video/audio from a surrounding of the device, etc.);

l) Device information indicating a device type with which a user interacts with a virtual assistant (e.g., a mobile device, a desktop computer, game system, etc.).

m) An orientation of a device which a user is using to interact with a virtual assistant (e.g., landscape or portrait).

n) A communication channel which a device of a user uses to interface with a virtual assistant service (e.g., wireless network, wired network, etc.).

o) A language associated with a user (e.g., a language of a query submitted by the user, what languages the user speaks, etc.).

p) How an interaction with a virtual assistant is initiated (e.g., via user selection of a link or graphic, via the virtual assistant proactively engaging a user, etc.).

How a user has been communicating recently (e.g., via text messaging, via email, etc.).

q) Information derived from a user's location (e.g., current, forecasted, or past weather at a location, major sports teams at the location, nearby restaurants, etc.).

r) Current topics of interest, either to a user or generally (e.g., trending micro-blog or blog topics, current news, recent micro-blog or blog posts made by the user, etc.).

s) Whether or not a user has signed-in with a site of a service provider (e.g., with a user name and password).

t) A status of a user with a service provider (e.g., based on miles flown, a type of membership of the user, a type of subscription purchased by the user, etc.).

u) A page of a site from which a user provides a query to a virtual assistant.

v) How long a user has remained on a page of a site from which the user provides a query to the virtual assistant.

w) Social media information describing interactions of a user via a social networking service (e.g., posts or other content that have been viewed and/or posted to a social networking site or blog).

x) Search information describing search input received from a user and search output provided to the user (e.g., a user searched for "luxury cars," and 45 search results were returned).

y) User preference information describing a preference of a user (e.g., a seat preference, a home airport, a preference of whether schedule or price is important to a user, a type of weather a user enjoys, types of items acquired by a user and identifying information for those items, types of stock a user owns or sold, etc.).

z) User profile information (e.g., information identifying friends/family of a user, information identifying where a user works or lives, information identifying a car a user owns, etc.).

zz) Purchase history identifying items that have been acquired by a user.

zzz) Any characteristic of a user (e.g., learned characteristics).

The interface module 216 may be configured to provide a virtual assistant trainer interface and/or a virtual assistant agency interface. The virtual assistant trainer interface may enable a trainer to train a virtual assistant. Through the trainer interface a trainer may associate a virtual assistant with the trainer so that interactions may be monitored, submit virtual assistants that have been trained to be offered for acquisition, review virtual assistant conversations, review virtual assistant base language models, set virtual assistant characteristics, and perform a variety of other operations. Example virtual assistant trainer interfaces are illustrated in FIGS. 4-7. Meanwhile, the virtual assistant agency interface may offer virtual assistants for acquisition to end-users. The virtual assistants may have been trained by the trainers through the virtual assistant trainer interface or otherwise configured (e.g., by the service provider 108). As described herein, the acquisition of a virtual assistant may be achieved through purchasing, renting, borrowing, trading, bartering, or otherwise obtaining the virtual assistant. An example virtual assistant agency interface is illustrated in FIG. 8.

The virtual assistant characteristic module 218 may be configured to customize or otherwise configure a characteristic of a virtual assistant. For example, in response to input from a trainer through a virtual assistant trainer interface regarding a virtual assistant characteristic, the virtual assistant characteristic model 218 may configure the virtual assistant characteristic. To illustrate, a trainer may request that a particular action and object (e.g., verb and noun) be associated with a particular task, and the virtual assistant characteristics model 218 may configure such a mapping. Additionally, or alternatively, the virtual assistant characteristic module 218 may configure a virtual assistant characteristic based on input from an end-user, such as through the interface illustrated in FIG. 10.

A characteristic of a virtual assistant may include any visual, functional, or other feature or attribute that may be used to define the virtual assistant. Characteristics of virtual assistants may be stored in a virtual assistant data store 230. Characteristics of a virtual assistant may define the persona of the virtual assistant. Example characteristics of a virtual assistant include:

a) Functionality—actions that a virtual assistant is configured to perform (e.g., tasks, services, etc.). For example, a sports virtual assistant may be configured to provide sports functionality, such as accessing sports web sites, providing sports scores in a particular format (e.g., outputting a box score for a baseball game), and so on. Whereas a medical virtual assistant may be configured to send messages to fill medical prescriptions, provide medical diagnostics (e.g., provide a series of questions to determine an illness), connect a user with a physician (e.g., send an email, make an appointment for an exam, etc.), and so on.

b) A task mapping—information that defines how tasks are mapped to concepts, actions (e.g., verbs), and/or objects (e.g., nouns). For example, a task mapping may identify that an action/object pair of send/message corresponds to a task of sending a text message. In another example, concepts of basketball and score may be mapped to a task of providing a score of a basketball game.

c) A base language model—information that forms the basis of a virtual assistant's language. A base language model may generally include a set of language units, with each language unit mapping a set of inputs (e.g., user queries or questions) to a task or response.

d) A lexicon—the set of words that are understood and/or used by a virtual assistant and the meaning of those words. For example, a travel virtual assistant may be associated with a set of travel words (e.g., flight terminology, car rental terminology, etc.). In this example, the travel virtual assistant may associate a term of "status" with "flight status," instead of "order status" for a purchased item (as may be the case for a different type of virtual assistant, such as an e-commerce virtual assistant).

e) An input processing technique(s)—a technique that is the basis for recognizing speech, touch, or text input. For example, a banking virtual assistant may be configured to recognize a particular number sequence with dashes (e.g., ###-##-####) as a social security number, whereas a different type of virtual assistant may merely recognize this as numbers and dashes. In another example, the banking virtual assistant may only be configured to receive or process touch or text input from a user so that confidential information is not spoken by a user and compromised. In yet a further example, a virtual assistant for teaching Spanish may be configured with Spanish and English NLP, whereas another type of virtual assistant may only be configured with English NLP.

f) A level of training—a degree to which a virtual assistant has been trained. For example, a virtual assistant that is associated with a relatively high degree of training may have been reconfigured multiple times by a plurality of trainers, may be have been trained by a highly rated trainer, and so on. As such, a level of training for a virtual assistant may be represented by a number of trainers that have configured the virtual assistant, what trainers have configured the virtual assistant (e.g., types of trainers), and so on.

g) A level of security access—the types of information that are accessible to a virtual assistant. For example, a messaging virtual assistant that manages email accounts for a user may have access to login passwords of those email accounts, whereas a sports virtual assistant may not. In some instances, if another virtual assistant has a level of security access to information that is needed to complete a task, processing may be passed to the other virtual assistant to complete the task. In another example, a banking virtual assistant that manages a banking account of a user may have access to relatively confidential information, such as a social security number of the user.

h) A visual appearance—how a virtual assistant is visually displayed (e.g., how the virtual assistant looks). This may include clothing, hair color, age, facial expressions, accessories (e.g., watches, necklaces, etc.), items associated with the virtual assistant (e.g., books for a professor, a calculator for a finance virtual assistant, a wrench for a mechanic virtual assistant, headphone for a travel agent, etc.), etc.

i) An audible manner of output—how a virtual assistant speaks to a user. This may include an accent of the virtual assistant (e.g., English, Australian, etc.), a fluctuation in the virtual assistant's speech (e.g., pronouncing a first word of a sentence different than other words of a sentence), how fast words are spoken, and so on.

j) A language in which a virtual assistant communicates (e.g., Spanish, German, French, English, etc.). This may include a language that is understood by the virtual assistant and/or a language that is spoken or otherwise used to output information by the virtual assistant.

k) A personality—how a virtual assistant responds to a user. For example, a virtual assistant may act cheerful (e.g., uses predetermined positive language, speaks in a predetermined upbeat tone, etc.), angry (e.g., speaks above a volume threshold, accents particular words, etc.), depressed (e.g., speaks below a word velocity threshold), and so on. In one instance, a virtual assistant may be configured to emulate or mimic how a user interacts with the virtual assistant (e.g., if the user talks fast, the virtual may speak fast; if the user uses text to input, the virtual assistant may output responses in text; etc.).

l) An industry for which a virtual assistant is configured, such as healthcare (e.g., doctor), finance (e.g., accounting, taxes, banking, etc.), travel, computer, sales, human resources, information technology (IT), automotive (e.g., mechanic, sales, etc.), sports, librarian, executive assistant, and so on.

m) A type of device for which a virtual assistant is configured, such as a mobile device, a desktop computer, a tablet computer, and so on.

n) A platform for which a virtual assistant is configured, such as a mobile platform (e.g., mobile operating system), personal computer platform (e.g., general purpose operating system), etc.

o) A location where a virtual assistant is stored (e.g., cloud vs. local, a physical location where the virtual assistant is stored, an entity where the virtual assistant is stored (application, service provider, etc.), etc.).

p) A type of service implementation (e.g., cloud service vs. local application).

q) A condition that triggers the output of a virtual assistant. For example, a travel virtual assistant may be configured to be output whenever a user arrives at an airport or hotel. In another example, an automotive virtual assistant may be output whenever a user's smart device connects to a car navigation system.

r) Entity that is associated with a virtual assistant. For example, a virtual assistant may have been generated by or for a particular user, application (e.g., program), company, service provider, device, etc. (e.g., personalized for a user, associated with a user's account, associated with a company, etc.).

As noted above, a team of virtual assistants may include virtual assistant with different characteristics. As such, the team of virtual assistants may be associated with different modules, entities, storage locations, method of implementation, and so on.

The virtual assistant output module 220 may be configured to identify virtual assistants to be output to end-users. To do so, the virtual assistant output module 220 may determine when particular conditions are satisfied to trigger the output of a virtual assistant. This may include analyzing or monitoring contextual information. When a virtual assistant is identified to be output, the virtual assistant output module 220 may cause the virtual assistant to be output (e.g., send an instruction to a client device to output the virtual assistant, send data representing the virtual assistant to a client device, etc.). To illustrate, assume that a user is interacting with an executive assistant virtual assistant and asks "do I need to pay any bills?" Based on this conversation information the virtual assistant output module 220 may determine that a finance virtual assistant should be output to answer the question. Here, the virtual assistant output module 220 may cause the finance virtual assistant to be presented. In another illustration, assume that a user has just arrived at the airport to depart on a flight. Based on the location of the user, and identifying a scheduled flight in the user's calendar, the virtual assistant output module 220 may cause a travel virtual assistant to be presented to the user when the user interacts with a smart device.

The virtual assistant communication module 222 may be configured to manage conversations between virtual assistants. As noted above, in some instances virtual assistants may communicate with each other to perform tasks for one or more users. For example, if a user desires to schedule a meeting with another user, the user may communicate this desire to a virtual assistant and the virtual assistant may communicate with the other user's virtual assistant to schedule the meeting. The virtual assistants may exchange calendar information to identify a time at which both users are available. In addition to managing communications between virtual assistants, the virtual assistant communication module 222 may cause representations of the conversation to be output via a conversation user interface. In returning to the scheduling example, a dialog representation may be presented showing that one virtual assistant asked when a user would be available, and another dialog representation may be presented showing that the other virtual assistant responded with times that the user is available. These dialog representations may assist a user in understanding a conversation between virtual assistants, which may have ultimately led to completion of a task for the user. In some instances, the virtual assistant communication module 222 may utilize contextual information to determine when and/or with whom to communicate. To illustrate, upon identifying that a user has arrived at an office building for a meeting with another user (e.g., based on location information), the user's virtual assistant may communicate with a virtual assistant of the other user to let the other user know that the user has arrived for the meeting.

Although the modules 208-222 are illustrated as being included in the virtual assistant service 108, in some instances one or more of these modules may be included in the smart device 104, the device 118, or elsewhere. As such, in some examples the virtual assistant service 108 may be eliminated entirely, such as in the case when all processing is performed locally at the smart device 104 (e.g., the smart device 104 operates independently). In addition, in some instances any of the data stores 224-230 may be included in elsewhere, such as within the smart device 104, the device 118, and/or the service provider 110.

Example Smart Device

Figure 3:
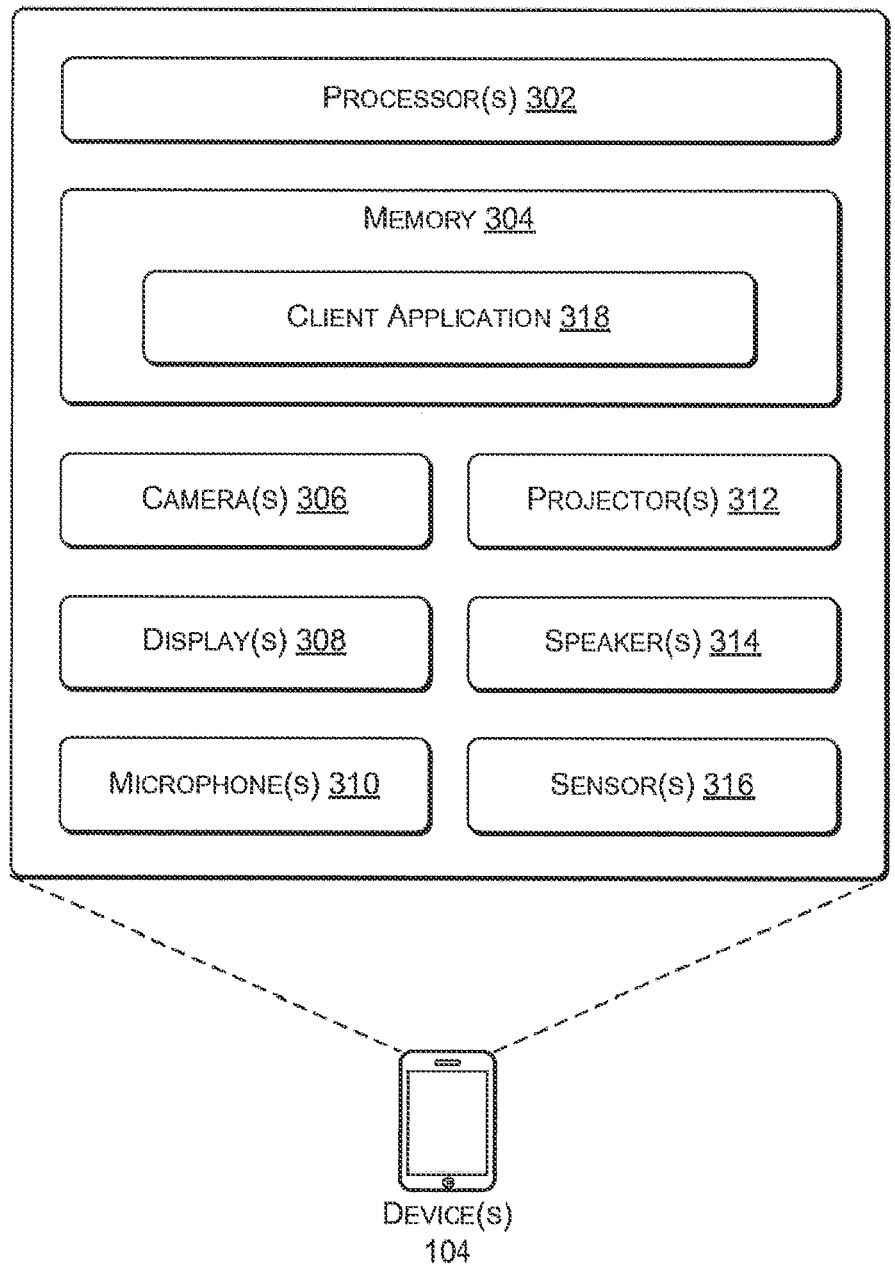
FIG. 3 illustrates example details of a smart device.

FIG. 3 illustrates details of the example smart device 104 of FIG. 1. The smart device 104 may be equipped with one or more processors 302, memory 304, one or more cameras 306, one or more displays 308, one or more microphones 310, one or more projectors 312, one or more speakers 314, and/or one or more sensors 316. The components 304-316 may be communicatively coupled to the one or more processors 302. The one or more processors 302 may include a central processing unit (CPU), a graphics processing unit (GPU), a microprocessor, a digital signal processor, and so on. The one or more cameras 306 may include a front facing camera and/or a rear facing camera. The one or more displays 308 may include a touch screen, a Liquid-crystal Display (LCD), a Light-emitting Diode (LED) display, an organic LED display, a plasma display, an electronic paper display, or any other type of technology. The one or more sensors 316 may include an accelerometer, compass, gyroscope, magnetometer, Global Positioning System (GPS), olfactory sensor (e.g., for smell), or other sensor. The components 306-314 may be configured to receive user input, such as gesture input (e.g., through the camera), touch input, audio or speech input, and so on, and/or may be configured to output content, such as audio, images, video, and so on. In some instances, the one or more displays 308, the one or more projectors 312, and/or the one or more speakers 314 may comprise a content output device configured to output content and/or a virtual assistant. In one example, the one or more projectors 312 may be configured to project a virtual assistant (e.g., output an image on a wall, present a hologram, etc.). Although not illustrated, the smart device 104 may also include one or more network interfaces.

The memory 108 may include a client application 318 (e.g., module) configured to implement a virtual assistant on a user-side. In many instances, the client application 318 may provide a conversation user interface to implement a virtual assistant. A conversation user interface may provide conversation representations (sometimes referred to as dialog representations) representing information from a virtual assistant and/or information from the user. For example, in response to a query from a user to "find the nearest restaurant," the conversation user interface may display a dialog representation of the user's query and a response item of the virtual assistant that identifies the nearest restaurant to the user. A conversation representation may comprise an icon (e.g., selectable or non-selectable), a menu item (e.g., drop down menu, radio control, etc.), text, a link, audio, video, or any other type of information.

The client application 318 may receive any type of input from a user, such as audio or speech, text, touch, or gesture input received through a sensor of the smart device 104. The client application 318 may also provide any type of output, such as audio, text, interface items (e.g., icons, buttons, menu elements, etc.), and so on. In some implementations, the client application 318 is implemented as, or in association with, a mobile application, a browser (e.g., mobile browser), and so on.

The memory 204 and/or 304 (as well as all other memory described herein) may include one or a combination of computer storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer storage media does not include communication media, such as modulated data signals and carrier waves. As such, computer storage media is non-transitory media.

Example Interfaces

FIGS. 4-13 illustrate example interfaces that may be presented to users, trainers, and others. The interfaces may be provided via a web browser, an application (e.g., mobile application, desktop application, etc.), and so on. Although many of the interfaces are illustrated as being presented via particular devices of the architecture 100, the interfaces may be presented via any device. Further, the interfaces may be facilitated or managed by any device in the architecture 100 or other devices.

Figure 4:
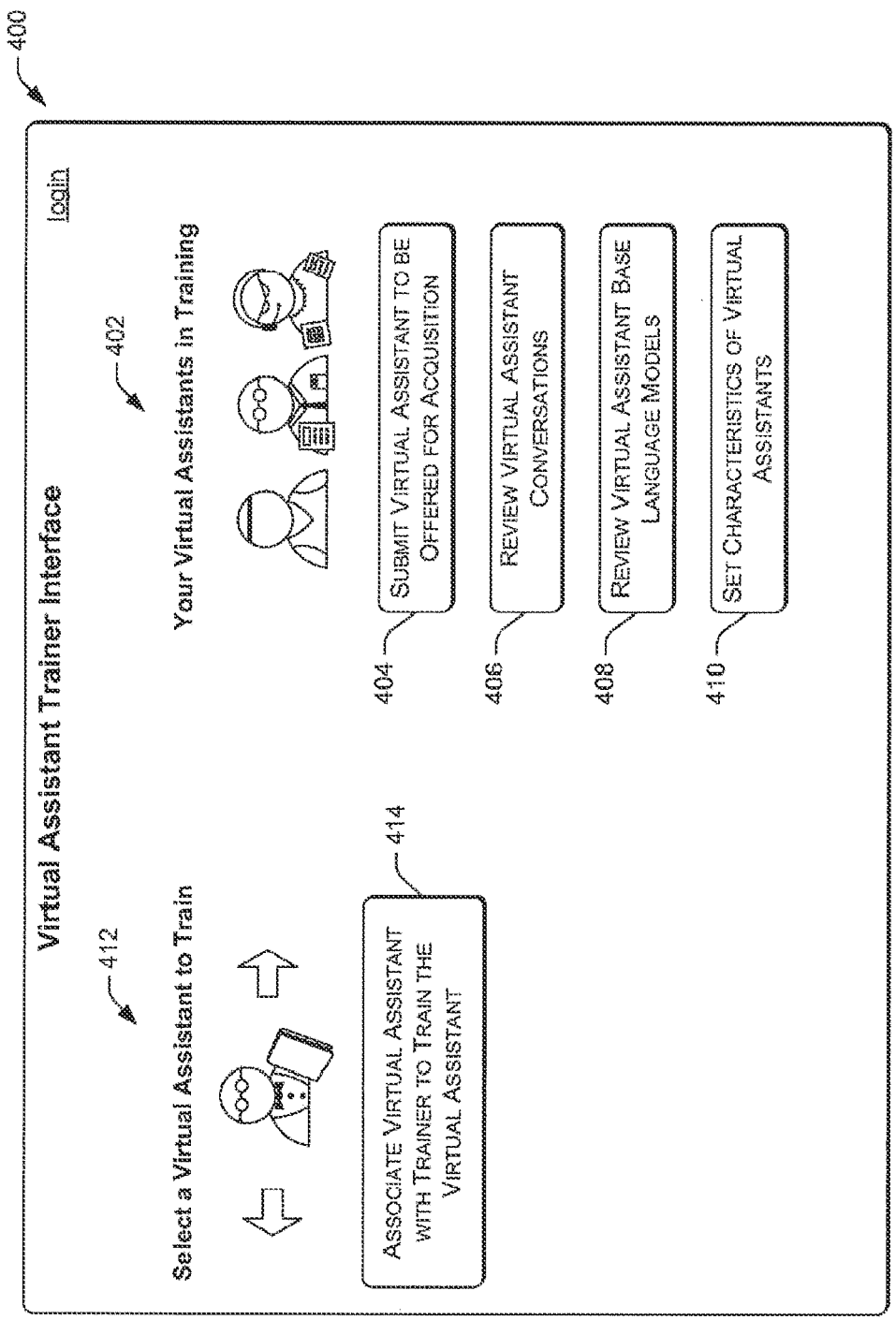
FIG. 4 illustrates an example virtual assistant trainer interface that may be presented to train a virtual assistant.

FIG. 4 illustrates an example virtual assistant trainer interface 400 that may be presented to train a virtual assistant. This and other virtual assistant trainer interfaces may enable a community of trainers to train virtual assistants, offer them for acquisition to end-users, build reputations for themselves, obtain compensation, and so on.

The virtual assistant trainer interface 400 may include a section 402 where a trainer may manage and train existing virtual assistants that have been associated with the trainer. As illustrated, the trainer may login to an account (e.g., a trainer account associated with the service provider 108) to access the virtual assistants. By selecting a button 404, the trainer may submit a trained version of a virtual assistant to be offered for acquisition to users. Here, the user may submit one of the virtual assistants that is selected below the heading "Your Virtual Assistants in Training." In some instances, after submitting a virtual assistant, the trainer may be directed to a page to obtain compensation (e.g., input bank account routing information, obtain gift cards, etc.). While in other instances, compensation may be paid out over time as trained versions of virtual assistants are acquired by users.

The virtual assistant trainer interface 400 also includes buttons 406-410, which may enable the trainer to review and/or configure information for a virtual assistant (e.g., a selected virtual assistant below the heading "Your Virtual Assistants in Training"). For example, by selecting the button 406, the trainer may review and provide feedback on virtual assistant conversations, such as those presented in FIG. 5. By selecting the button 408, the trainer may review and configure base language models of virtual assistants, such as those illustrated in FIG. 6. And, by selecting the button 410, the trainer may set or configure characteristics of a virtual assistant, such as those illustrated in FIG. 7.

Although the virtual assistant trainer interface 400 illustrates buttons 406-410 for training virtual assistants (e.g., direct configuration of virtual assistants), in some instances a trainer may train a virtual assistant indirectly through a conversation user interface. The trainer may interact with the virtual assistant overtime and correct responses or tasks that the virtual assistant performs that the trainer believes are inappropriate.

The virtual assistant trainer interface 400 also includes a section 412 for selecting a new virtual assistant to be trained. Here, the virtual assistants below the heading "Select a Virtual Assistant to Train" may include default or partially trained virtual assistants that may be made available to trainers. By selecting a button 414, the trainer may be associated a selected virtual assistant (e.g., a trainer account), which may cause the virtual assistant to be presented in the section 402 and/or associated with a conversation user interface of the trainer.

Figure 5:
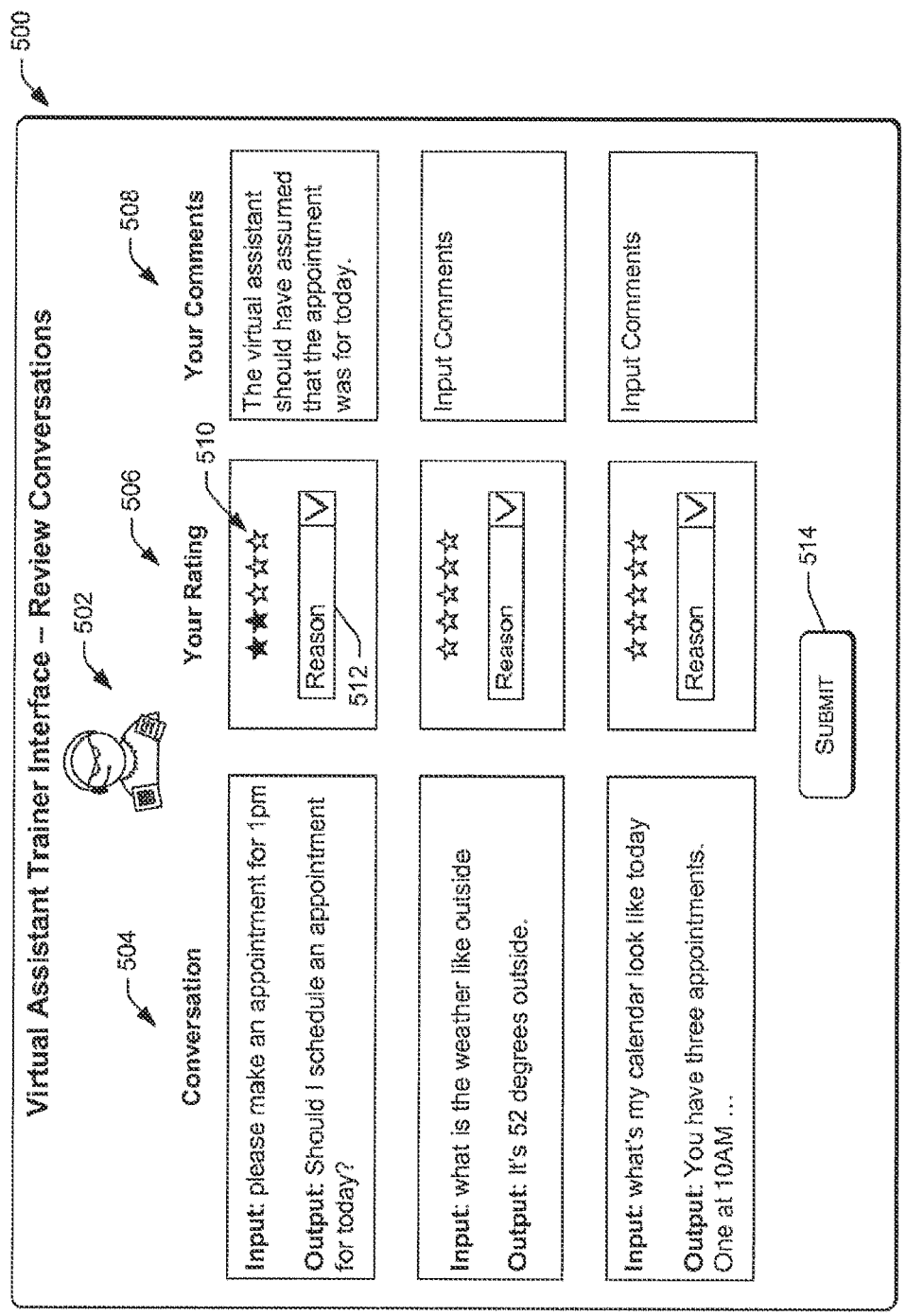
FIG. 5 illustrates an example virtual assistant trainer interface to review and provide feedback on virtual assistant conversations.

FIG. 5 illustrates an example virtual assistant trainer interface 500 to review and provide feedback on virtual assistant conversations. By doing so, a virtual assistant may be evaluated and reconfigured so that more suitable responses are provided and tasks are performed. In this example, a trainer has selected to review conversation for an executive assistant virtual assistant 502.

A conversation section 504 of the virtual assistant trainer interface 500 may present conversation input and output for the virtual assistant 502. These inputs and outputs may be from conversations that the trainer or others have had with the virtual assistant 502. The trainer may review the inputs and outputs and provide feedback in a rating section 506 and a comments section 508. For example, here the trainer has left two stars in a star section 510 for the output of the virtual assistant 502 and has left a comment in the comments section 508 as to why such a rating was provided. Although the trainer has not done so in this example, the trainer may additionally provide a reason for a rating through a drop-down menu 512.

Upon providing feedback, the trainer may select a button 514 to submit the feedback. The feedback may be used to reconfigure the virtual assistant 502 (e.g., so that the next time a user asks "please make an appointment for 1 pm," or similar input, the virtual assistant 502 schedules an appointment for 1 pm that day, without further prompting the user for a date).

Figure 6:
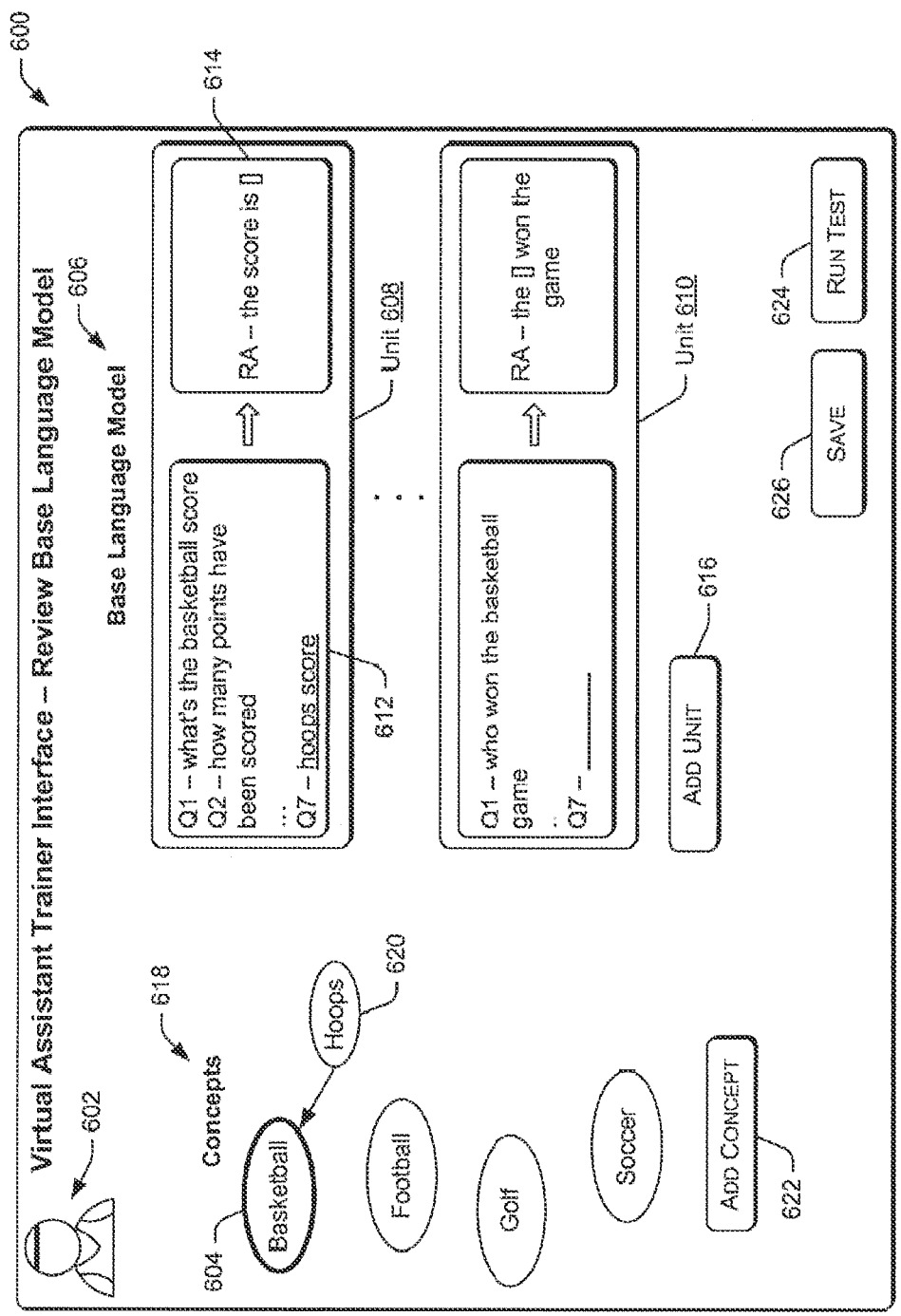
FIG. 6 illustrates an example virtual assistant trainer interface to review and configure base language models of virtual assistants.

FIG. 6 illustrates an example virtual assistant trainer interface 600 to review and configure base language models of virtual assistants. As noted above, a base language model may form the basis of a virtual assistant's language and may include a set of language units, with each language unit mapping a set of inputs (e.g., user queries or questions) to a task or response. Here, a trainer has selected to configure a base language model of a sports virtual assistant 602. In particular, the trainer has selected a particular concept of the base language model, namely a basketball concept 604.

As illustrated, the virtual assistant trainer interface 600 presents a base language model 606 for the basketball concept 604. The base language model 606 includes language units 608 and 610. For example, the language unit 608 includes a set of input 612 that is mapped to a response 614 (or task). Although the set of input 612 is illustrated as questions, the set of input 612 may alternatively, or additionally, include any type of user input (e.g., statements, phrases, etc.). The sports virtual assistant 602 may provide response 614 for any of the set of input 612. In some instances, input can be modified to include a sport concept. Through the virtual assistant trainer interface 600, the trainer may reconfigure the base language model 606 by adding content to the set of input 612, updating the response 614, and/or adding an additional language unit through a button 616. The trainer may also change a data source that is accessed to formulate a response (e.g., a data source used to find a score of a game). In this example, the trainer has added content "hoops score" to the set of input 612, so that this phrase corresponds to a response of "the score is H" (where brackets indicate information to be filled in). In some instances, a base language model for another sport may be created by adding another concept and selecting the concept to be included as a concept for a base language model.

The virtual assistant trainer interface 600 may also include a section 618 to illustrate concepts that are associated with the sports virtual assistant 602 (e.g., concepts that may be interpreted from input of a user). The trainer may reconfigure the concepts by creating new associations, such as by linking a concept 620 with the basketball concept 604, and/or by adding additional concepts, such as by selecting a button 622.

The trainer may test any changes that have been made to the concepts and/or base language models of the sports virtual assistant 602 by selecting a button 624. The test may verify that no errors have been created (e.g., conflicts between concepts, conflicts between mappings of inputs sets and response, etc.). Further, the trainer may save any changes made through the virtual assistant trainer interface 600 by selecting a save button 626.

Figure 7:
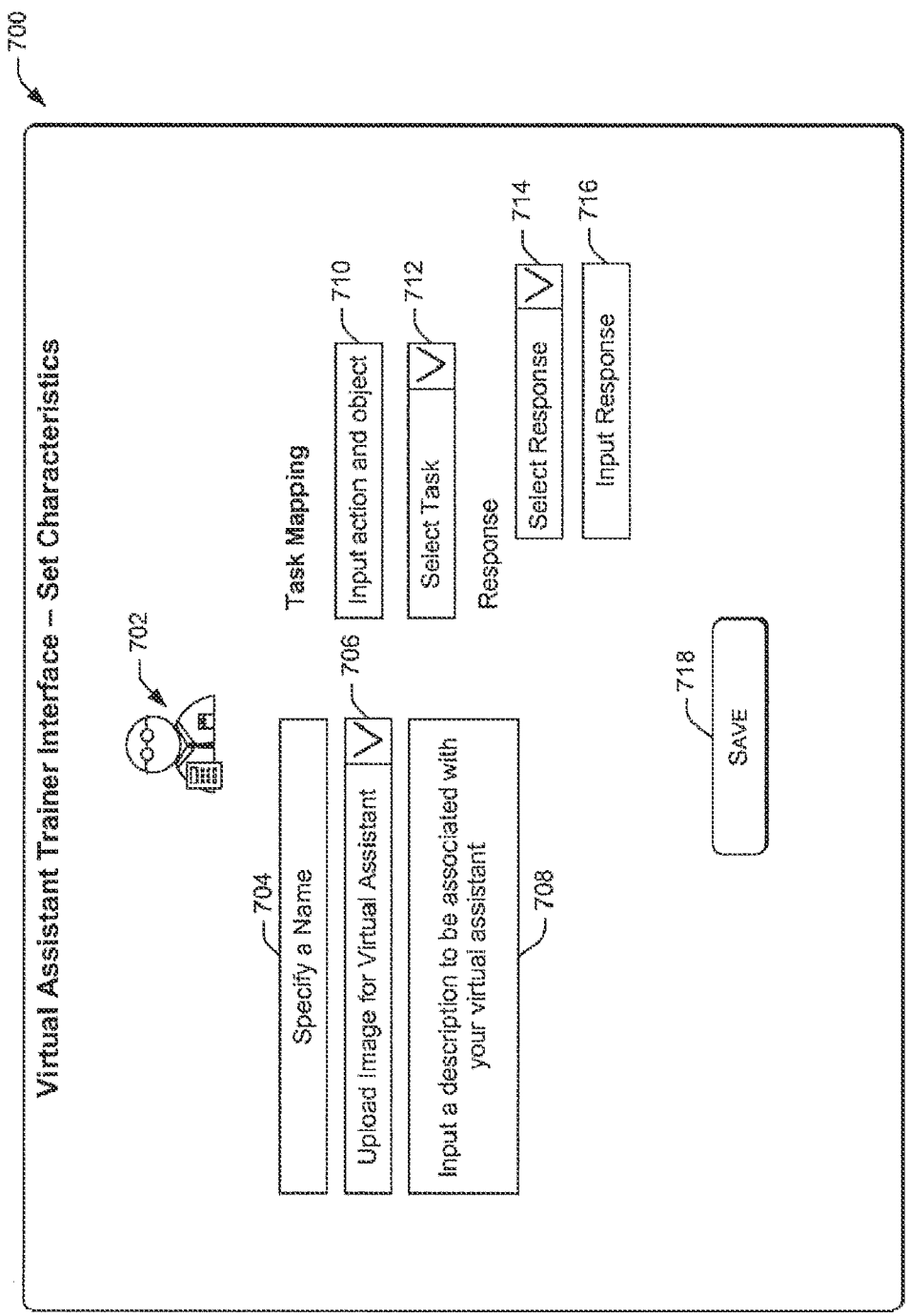
FIG. 7 illustrates an example virtual assistant trainer interface to set or configure characteristics of a virtual assistant.
Figure 8:
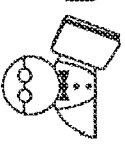
FIG. 8 illustrates an example virtual assistant agency interface to offer virtual assistants for acquisition.

FIG. 7 illustrates an example virtual assistant trainer interface 700 to set or configure characteristics of a virtual assistant. Here, a trainer may configure characteristics of a finance virtual assistant 702.

The virtual assistant trainer interface 700 may include an input field 704 to set a name of the finance virtual assistant 702, a drop-down menu 706 to upload an image to be associated with the finance virtual assistant 702 (e.g., configure a visual appearance of a virtual assistant), and an input field 708 to input a description of the finance virtual assistant 702 (e.g., capabilities, the types of training that the finance virtual assistant 702 has been subjected to, information about the trainer, and so on). The virtual assistant trainer interface 700 may also include an input field 710 to specify an action (e.g., verb) and object (e.g., noun) to be associated with a particular task selected through a drop-down menu 712. The action and object may additionally be associated with a response through selection of a response in a drop-down menu 714 and/or text input through an input field 716. The trainer may save any changes to the finance virtual assistant 702 by selecting a button 718.

FIG. 8 illustrates an example virtual assistant agency interface 800 to offer virtual assistants for acquisition. The virtual assistants may include different characteristics. In some instances, the virtual assistants may have been trained by trainers, while in other instances the virtual assistants may be configured by the virtual assistant service 108 or other services.

The virtual assistant agency interface 800 includes a section 802 that shows tops selling virtual assistants. Each virtual assistant may be provided with various types of information, including a subject or industry for which the virtual assistant is configured, a general description of the virtual assistant, a rating of the virtual assistant (e.g., user rating, rating from an automatic evaluation, etc.), a level of training associated with the virtual assistant, information about a trainer (e.g., user reviews of the trainer, ratings of the trainer by users or others, etc.), and a value for which the virtual assistant is being offered for acquisition (e.g., a price).

The virtual assistant agency interface 800 also includes a section 804 that shows virtual assistants that may be deemed to be of interest to a user. These virtual assistants may be identified based on an analysis of contextual information, such as user preferences, pervious conversations, and so on. Although not illustrated in FIG. 8, the virtual assistant agency interface 800 may additionally include virtual assistant team packages that include multiple virtual assistants that are offered for acquisition in a package. The virtual assistant agency interface 800 may also include a search field 806 to search through virtual assistants.

Through the virtual assistant agency interface 800 a user may acquire a virtual assistant (e.g., by selecting a buy button). Upon acquiring a virtual assistant, the virtual assistant may be associated with the user, so that the user may utilize the virtual assistant in a conversation user interface. In some examples, the user may at least partially download a virtual assistant to a smart device, while in other instances the virtual assistant may merely be identified and associated with an account of the user. Although the virtual assistant agency interface 800 offers virtual assistants for purchase, in some instances the virtual assistants may otherwise be offered for acquisition, such as for free, in a bidding manner, or otherwise.

Figure 9:
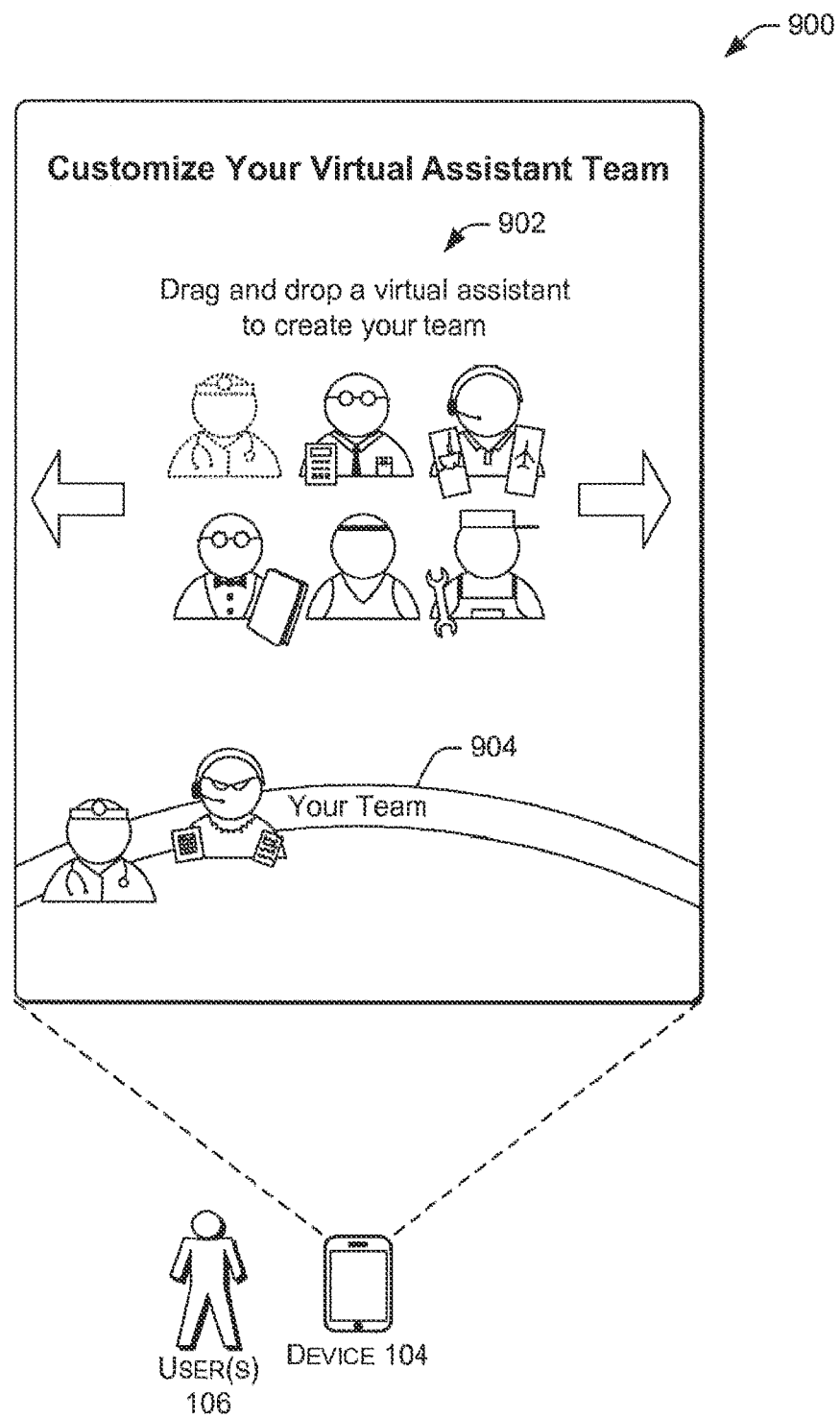
FIG. 9 illustrates an example virtual assistant customization interface for enabling end-users to configure virtual assistant teams.

FIG. 9 illustrates an example virtual assistant customization interface 900 for enabling end-users to configure virtual assistant teams. In this example, a user may enable or disable various virtual assistants by moving virtual assistants between a section 902 representing a pool of available virtual assistants and an icon 904 representing the user's enabled team. In some instances, the virtual assistants in the section 902 include a set of default virtual assistants that are made available by a virtual assistant service, while in other instances the virtual assistants may have been acquired by the user. When a virtual assistant is enabled for presentation, the virtual assistant may comprise part of an available set of virtual assistants that may be presented to the user during a conversation.

To enable a virtual assistant for presentation through a conversation user interface, the user may drag a virtual assistant from the section 902 and drop the virtual assistant on the icon 904. In contrast, to disable a virtual assistant for presentation, the user may drag the virtual assistant from the icon 904 to the section 902. The icon 904 may move in a scroll-like manner from left-to-right or right-to-left. In some instances, a similar icon to the icon 904 is presented to the user in a conversation user interface to enable the user to choose between various virtual assistants that are available to carry out a conversation.

Figure 10:
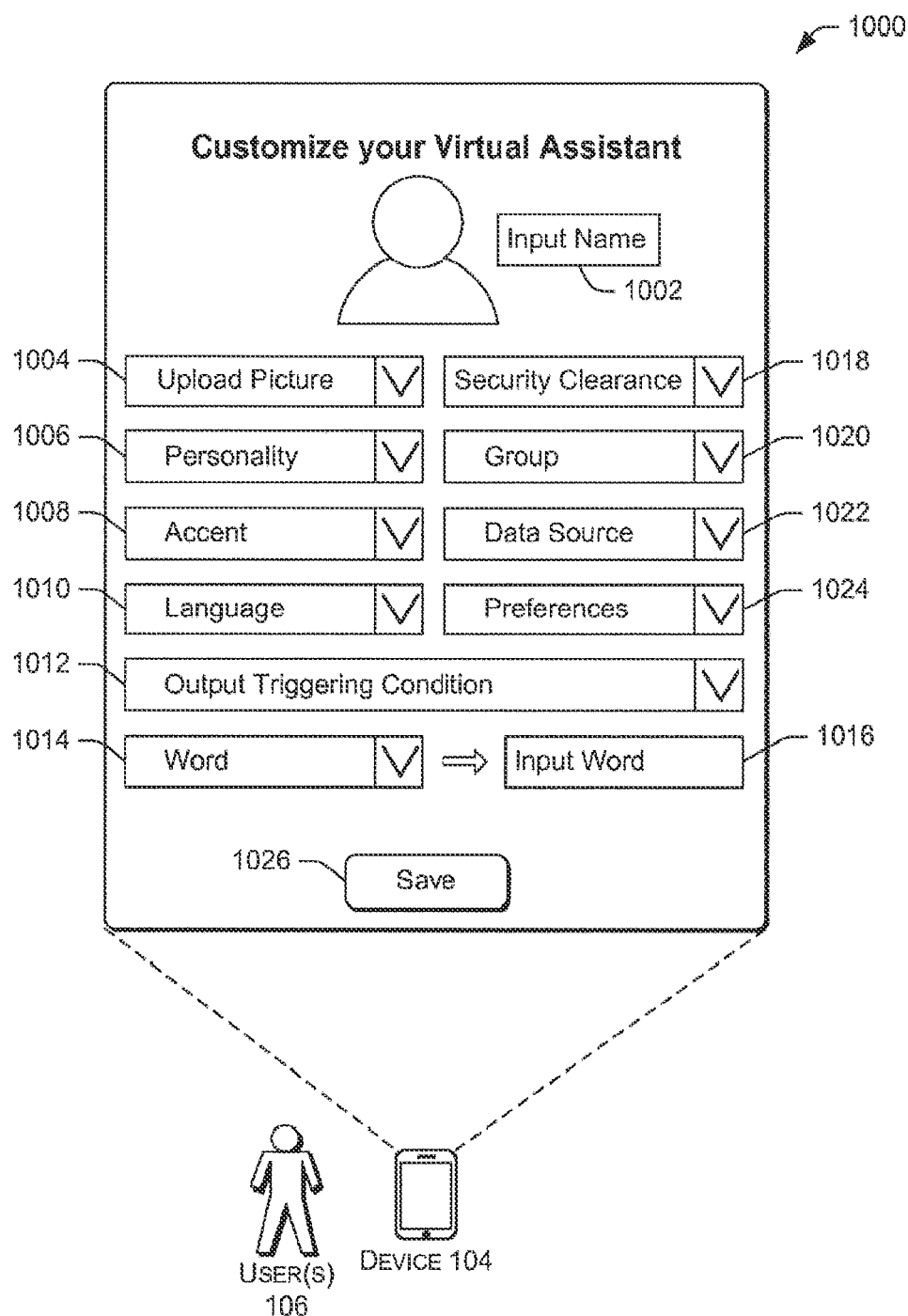
FIG. 10 illustrates an example virtual assistant customization interface for enabling end-users to configure characteristics of a virtual assistant.

FIG. 10 illustrates an example virtual assistant customization interface 1000 for enabling end-users to configure characteristics of a virtual assistant. As illustrated, the virtual assistant customization interface 1000 includes an input field 1002 to input a name to be associated with the virtual assistant, a drop-down menu 1004 to upload an image to be associated with the virtual assistant (e.g., to configure a visual appearance), a drop-down menu 1006 to select a personality (e.g., attitude, etc.), a drop-down menu 1008 to select an accent, a drop-down menu 1010 to select a language in which the virtual assistant is to be configured to communicate, a drop-down menu 1012 to select a output triggering condition (e.g., present a sports virtual assistant anytime a particular basketball team is playing, present a flight virtual assistant upon arrival at a particular location, etc.), and a drop-down menu 1014 to specify that a particular word corresponds to a word specified in input field 1016 (e.g., specify that "basketball" and "hoops" mean the same thing).

Further, the virtual assistant customization interface 1000 includes a drop-down menu 1018 to select a level of security to be associated with the virtual assistant (e.g., the virtual assistant cannot access documents tagged as confidential, the virtual assistant can access a credit card number, etc.), a drop-down menu 1020 to specify what group the virtual assistant is to be associated with (e.g., a basketball virtual assistant should be grouped with sports virtual assistants), a drop-down menu 1022 to specify a data source to utilize for obtaining information (e.g., access pictures in a particular folder), and a drop-down menu 1024 to select a preference of the user to utilize to interpret input and perform tasks (e.g., books flights with a preferred seat type, ship items according to a preferred type of shipping, etc.). The user may save any changes through a button 1026.

Figure 11:
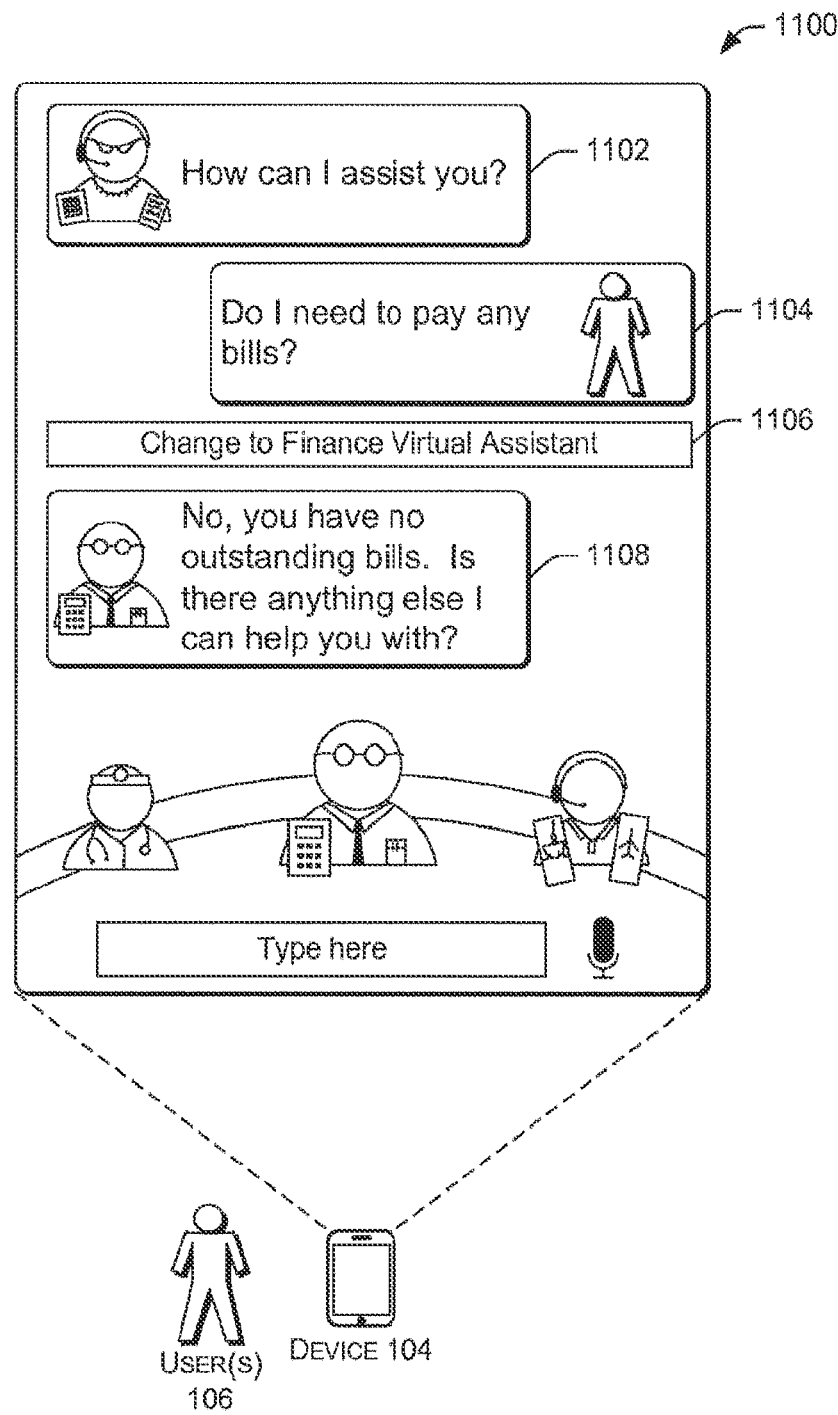
FIG. 11 illustrates an example conversation user interface where a virtual assistant is switched based on user input.

FIG. 11 illustrates an example conversation user interface 1100 where a virtual assistant is switched based on user input. In this example, an executive assistant virtual assistant is initiated when the conversation user interface 1100 is opened, as illustrated by a conversation item 1102. Here, the user requests "Do I need to pay any bills?," as illustrated by a conversation item 1104. Based on this information, the executive assistant virtual assistant may determine that a finance virtual assistant is needed, since the executive assistant virtual assistant may not have access to any bill information. Accordingly, the conversation is turned over to the finance virtual assistant, as illustrated by an icon 1106 that indicates that a change in virtual assistants was made. The finance virtual assistant may then answer the question, as illustrated by an icon 1108.

In this example the change occurs automatically in response to receiving user input that is interpreted as requesting a change. However, in other instances the change may occur in response to other output triggering conditions being satisfied.

Figure 12:
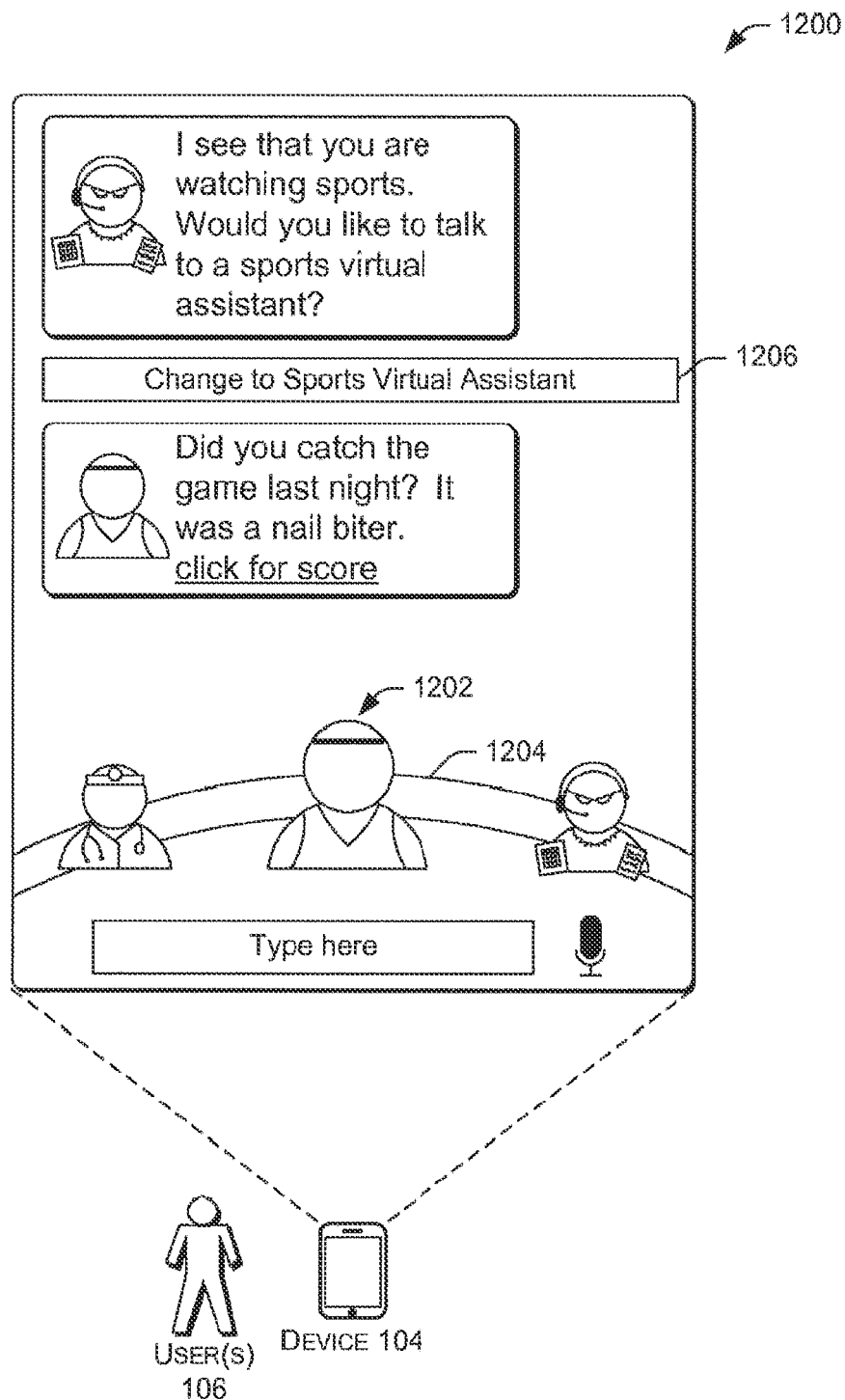
FIG. 12 illustrates an example conversation user interface where a virtual assistant is switched in response to a user selection of a suggested virtual assistant.

FIG. 12 illustrates an example conversation user interface 1200 where a virtual assistant is switched in response to a user selection of a suggested virtual assistant. In this example, an executive assistant virtual assistant determines that the user is watching a sports game on a television (e.g., based on an analysis of content output history). Here, a suggestion to switch to a sports virtual assistant 1202 is made by rotating an icon 1204 (e.g., ribbon) to present the sports virtual assistant 1202 in a center of the conversation user interface 1200. In other examples, the suggestion may be made in other ways. In this example, the user has accepted the suggestion by selecting the sports virtual assistant 1202, and the sports virtual assistant 1202 is enabled to interact with the user, as illustrated by an icon 1206. The sports virtual assistant 1202 may then communicate with the user.

Although not illustrated in FIG. 12, in some instances the icon 1204 may be updated with different types of sports virtual assistants when the sports virtual assistant 1202 is selected. For example, the icon 1204 may be updated to include virtual assistants for the different types of sports (e.g., football, basketball, baseball, etc.).

Figure 13:
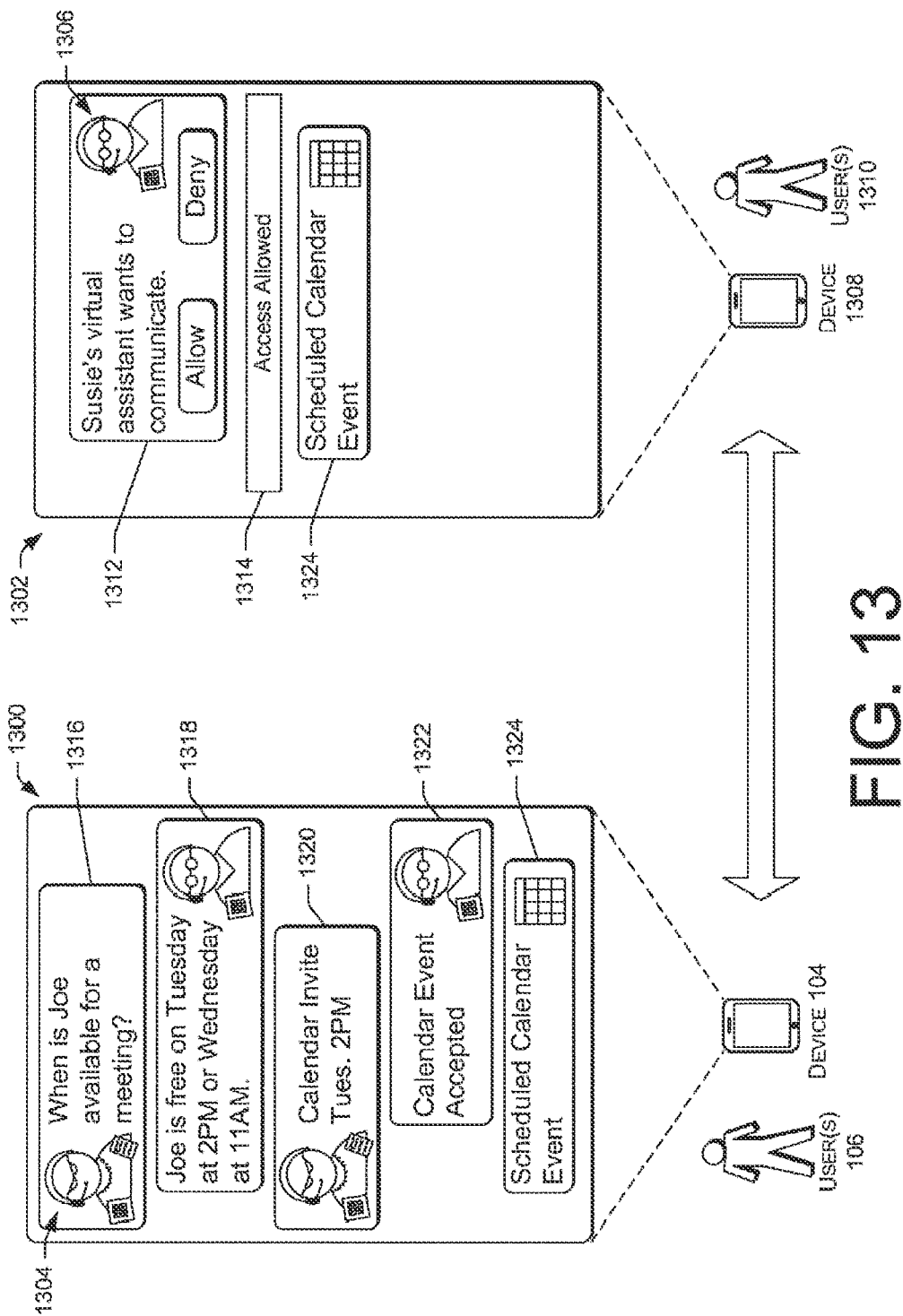
FIG. 13 illustrates example conversation user interfaces that may be presented to show a conversation between virtual assistants.

FIG. 13 illustrates example conversation user interfaces 1300 and 1302 that may be presented to show a conversation between virtual assistants. In this example, a virtual assistant 1304 that is implemented via the smart device 104 may communication with a virtual assistant 1306 that is implemented via a smart device 1308 associated with a user 1310. Here, the user 106 (e.g., Susie) has requested that a meeting be scheduled with the user 1310 (e.g., Joe). Accordingly, the virtual assistant 1304 initiates communication with the virtual assistant 1306 by sending a request for authorization to communicate, as illustrated by a conversation item 1312. The user 1310 may allow or deny the communication through the conversation item 1312. In this example, the user 1310 has selected the "Allow" button and the virtual assistant 1304 and the virtual assistant 1306 may communicate to schedule the meeting, as indicated by a conversation item 1314.

To schedule the meeting, the virtual assistant 1304 may request to know when the user 1310 is available and a conversation item 1316 may be presented to illustrate the communication from the virtual assistant 1304. Next, the virtual assistant 1306 may respond with times that the user 1310 is available and a conversation item 1318 may be presented. The virtual assistant 1304 may then send a calendar invitation, as illustrated by a conversation item 1320, and the virtual assistant 1306 may accept the invitation, as illustrated by a conversation item 1322. After the meeting has been scheduled, a calendar event 1324 may be presented via the conversation user interface 1300 and the conversation user interface 1302 to indicate that the meeting has been scheduled.

In some instances, the conversation items 1316, 1318, 1320, 1322, 1324, and/or other conversation items may be presented one-by-one after a particular amount of time to indicate a back-and-forth conversation between the virtual assistant 1304 and the virtual assistant 1306.

Although the example of FIG. 13 illustrates communications between virtual assistants of different entities, similar processing may take place for communications between other types of virtual assistants. In one example, virtual assistants that are associated with a same user may communication and present conversation items to represent the communications. Further, although the conversation user interface 1300 and the conversation user interface 1302 do not mirror each other (e.g., different conversation items are included), in some instances the same conversations items may be shown in the conversation user interface 1300 and the conversation user interface 1302.

Example Processes

FIGS. 14-20 illustrate example processes 1400, 1500, 1600, 1700, 1800, 1900, and 2000 for employing the techniques described herein. For ease of illustration the processes 1400, 1500, 1600, 1700, 1800, 1900, and 2000 are described as being performed in the architecture 100 of FIG. 1. For example, one or more of the individual operations of the processes 1400, 1500, 1600, 1700, 1800, 1900, and 2000 may be performed by the smart device 104, the virtual assistant service 108, and/or the device 118. However, the processes 1400, 1500, 1600, 1700, 1800, 1900, and 2000 may be performed in other architectures. Moreover, the architecture 100 may be used to perform other processes.

In some instances of the processes 1400, 1500, 1600, 1700, 1800, 1900, and 2000, the virtual assistant service 108, the smart device 104, and/or the device 118 may cause an action to be performed, such as causing display of an interface. In some instances, this may include performing the action at the device that is causing the action to be performed, while in other instances this may include sending an instruction or other data to another device to cause the action to be performed at the other device. For example, the virtual assistant service 108 may cause a virtual assistant to be output on the smart device 104 by sending an instruction or data to the smart device 104 instructing the smart device 104 to output the virtual assistant.

The processes 1400, 1500, 1600, 1700, 1800, 1900, and 2000 (as well as each process described herein) are illustrated as a logical flow graph, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the described operations may be omitted.

Figure 14:
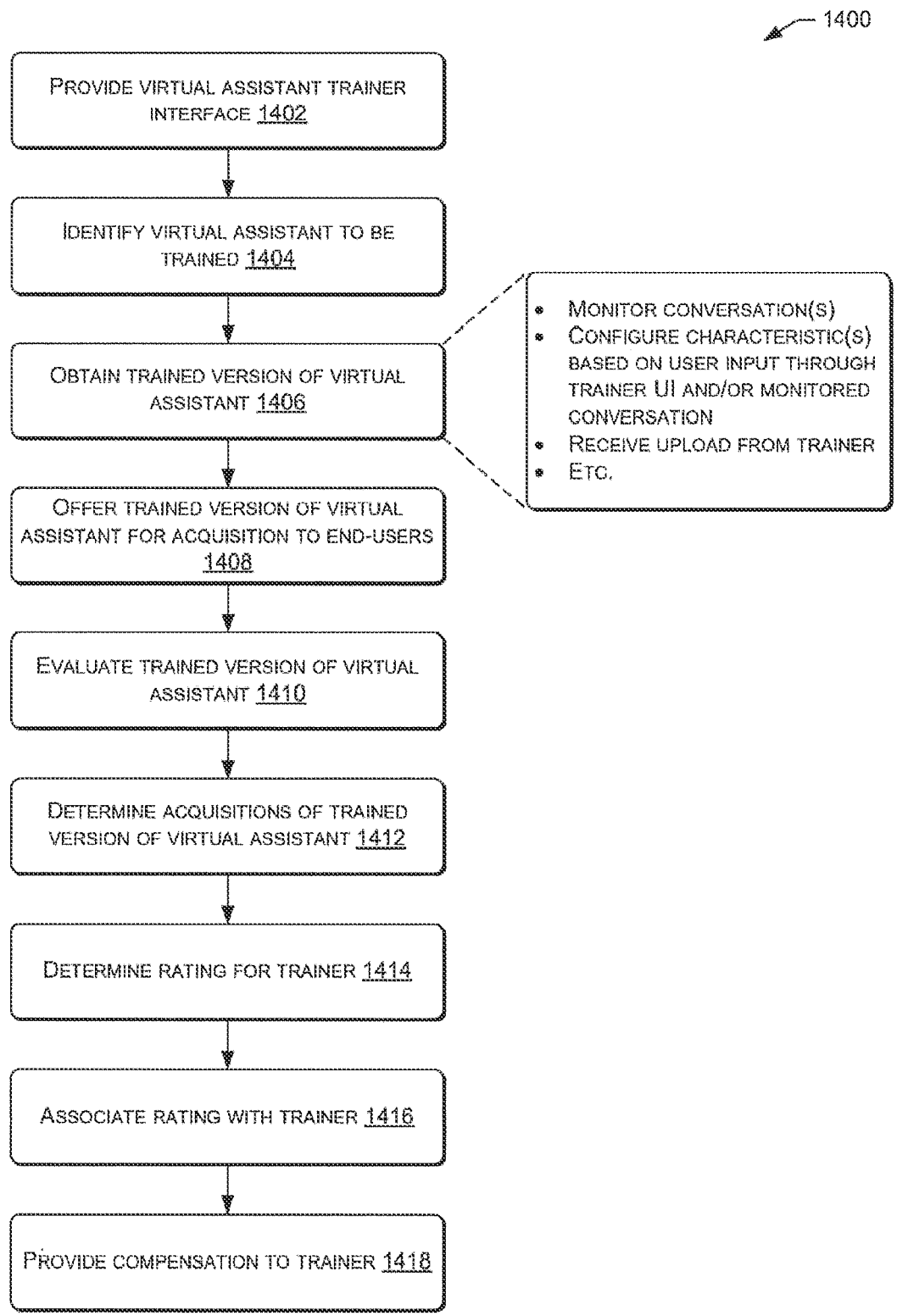
FIG. 14 illustrates an example process for obtaining trained versions of virtual assistants from trainers.

FIG. 14 illustrates the example process 1400 for obtaining trained versions of virtual assistants from trainers.

At 1402, a virtual assistant trainer interface may be provided for display. The virtual assistant trainer interface may include elements to enable a trainer to train a virtual assistant. For example, the virtual assistant trainer interface may enable the trainer to associate a virtual assistant with the trainer for training, review previous conversations between a user and a virtual assistant, review base language models of virtual assistants, configure a characteristic of a virtual assistant (e.g., a base language model, a concept that is utilized to interpret input, etc.), and so on. Additionally, or alternatively, the virtual assistant trainer interface may include elements to submit a trained version of a virtual assistant to be offered for acquisition to users.

At 1404, a virtual assistant may be identified to be trained by a trainer. This may include receiving user input via the virtual assistant trainer interface indicating a desire to train a virtual assistant (e.g., selecting a virtual assistant from a set of default, untrained, or partially trained virtual assistants that are made available). In some instances, the identified virtual assistant may be associated with the trainer so that the virtual assistant may be used by the trainer and so that conversations may be monitored to configure the virtual assistant. To illustrate, the identified virtual assistant may be associated with an account of the trainer that is managed by the virtual assistant service 108, enabling the trainer to use the virtual assistant. Further, in some instances the identified virtual assistant may be at least partially downloaded locally to a client device of the trainer so that the virtual assistant may be used.

At 1406, a trained version of a virtual assistant may be obtained. This may include monitoring conversations of a trainer with a virtual assistant (e.g., overtime or in any conversation) to learn how to response to user input and configuring a characteristic of the virtual assistant based on the learning. To illustrate, assume a language translator virtual assistant (e.g., from English to Spanish) is interacting with a trainer and returns an incorrectly translated phrase. Here, the trainer may tell the virtual assistant that the phrase was incorrectly translated (e.g., "no, this phrase should have been translated to . . . ") and the underlying functionality of the virtual assistant may be reconfigured so that the phrase is correctly translated the next time. In another illustration, assume that a sports virtual assistant searches for a hula hoop online in response to input that from the trainer that includes the term "hoop" (e.g., "what's going on with the hoops game?," "what's the score in the hoops game," etc.). Here, the trainer may navigate away from a hula hoop website provided by the sports virtual assistant to a basketball website. If, for example, this occurs more than a particular number of times, the sports virtual assistant may be reconfigured so that "hoops" corresponds to "basketball" (e.g., the term "hoops" is associated with the concept of "basketball").

Alternatively, or additionally, a trained version of a virtual assistant may be obtained by receiving input through the virtual assistant trainer interface to configure a characteristic of a virtual assistant. For instance, the virtual assistant trainer interface may display a previous conversation of the virtual assistant with a user (e.g., any user or the trainer's previous conversations with the virtual assistant), and the trainer may provide feedback regarding a response of the virtual assistant that was provided during the previous conversation, such as a rating for the response that indicates how appropriate the response was to input from the user. In another instance, the virtual assistant trainer interface may display a base language model of a virtual assistant and the trainer may provide input to reconfigure the base language model (e.g., updating a response that is mapped to a set of user input, adding user input to a set of user input, etc.). A base language model may maps a response or task to a set of user input. In yet another instance, the virtual assistant trainer interface may display a set of concepts utilized by the virtual assistant to interpret user input, and the trainer may reconfigure a concept of the set of concepts (e.g., associate the concept of "hoops" with the concept of "basketball").

Further, a trained version of a virtual assistant may be obtained by receiving an upload from the trainer that includes a reconfigured virtual assistant either directly or indirectly through conversation in one of the manners discussed above. The trainer may upload the trained version of the virtual assistant through the virtual assistant trainer interface or otherwise (e.g., provide a locally stored copy to the virtual assistant service 108).

At 1408, a trained version of a virtual assistant may be offered for acquisition to an end-user. For example, a trained version of a virtual assistant may be offered for acquisition through a virtual assistant agency interface.

At 1410, a trained version of a virtual assistant may be evaluated. This may include subjecting the trained version of the virtual assistant to a set of tests to make sure that the virtual assistant satisfies one or more criteria (e.g., does not ask more than a particular number of follow-up questions (makes appropriate assumptions), does not provide responses indicating that user input was not understood, functions properly (no errors), characteristics were actually reconfigured (perform comparison with previous characteristics), etc.). The set of tests may be performed by the virtual assistant service 108, sometimes in an automated manner.

At 1412, acquisitions of a trained version of a virtual assistant may be determined. This may include determining a number of acquisitions of the trained version of the virtual assistant by users, how much revenue has been generated by acquisitions of the trained version of the virtual assistant, and so on.

At 1414, a rating may be determined for a trainer. The rating may be based on the evaluation of the trained version of the virtual assistant at 1410 (e.g., rating increases as the evaluation increases), the determined acquisitions of trained version of virtual assistants at 1412 (e.g., rating increases as the number of acquisitions increases), and so on.

At 1416, a rating that is determined at 1414 may be associated with a trainer. This may include associating the rating with a user profile for the trainer. As such, the trainer may build a reputation by training virtual assistants.

At 1418, compensation may be provided to a trainer for having trained a virtual assistant. The amount of compensation may be based on the evaluation of the trained version of the virtual assistant at 1410 (e.g., compensation increases as the evaluation increases), the determined acquisitions of trained version of virtual assistants at 1412 (e.g., compensation increases as the number of acquisitions increases), and so on. In some instances, a trainer may be compensated overtime as virtual assistants that were trained by the trainer are acquired by users (e.g., receive a royalty payment for each acquired virtual assistant). Compensation may include money, gift cards, reputation points, awards, and so on.

Although 1410-1418 are illustrated as being performed after the operation 1408, in some instances these operations may be performed in parallel with and/or before the operation 1408.

Figure 15:
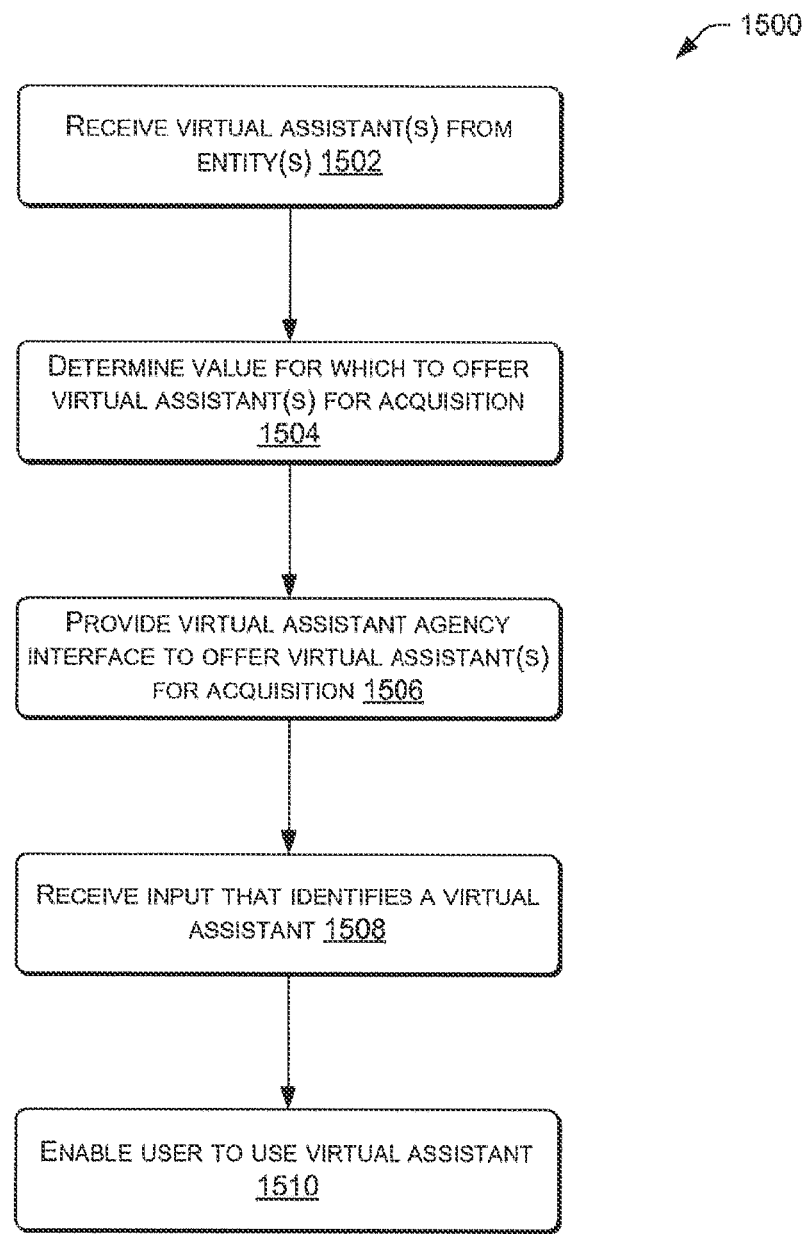
FIG. 15 illustrates an example process for offering virtual assistants for acquisition.

FIG. 15 illustrates the example process 1500 for offering virtual assistants for acquisition.

At 1502, one or more virtual assistants may be received from one or more entities. In some instances, a virtual assistant is received through a virtual assistant trainer interface (e.g., submitting a virtual assistant). An entity may include a user (e.g., trainer or end-user), application (e.g., program), company, service provider, device, and so on. As such, in some instances the one or more received virtual assistants may comprise trained versions of virtual assistants.

At 1504, a value for a virtual assistant may be determined. A value may include a price or other value at which to offer a virtual assistant for acquisition to users. A value of a virtual assistant may be determined based on an amount of training that the virtual assistant has received, a rating of a trainer that trained the virtual assistant, and/or a rating of the virtual assistant (e.g., previous user rating associated with the virtual assistant).

At 1506, a virtual assistant agency interface may be provided to offer one or more virtual assistants for acquisition. In some instances, the virtual assistant agency interface offers multiple virtual assistants that include different characteristics. The virtual assistant agency interface may offer a virtual assistant for acquisition at a value that is determined at the operation 1504. Further, the virtual assistant agency interface may present information describing functionality of a virtual assistant, an evaluation of a trainer that trained a virtual assistant (e.g., user rating/review of a trainer, rating determined by the virtual assistant service 108, etc.), and/or an evaluation of a virtual assistant (e.g., user rating/review of a virtual assistant).

At 1508, input may be received that identifies a virtual assistant. The input may be received via the virtual assistant agency interface (e.g., a selection of a virtual assistant to purchase). In some instances, a form of payment for the virtual assistant may also be received.

At 1510, a user may be enabled to use the identified virtual assistant. In some instances, this may include associating the virtual assistant with the user (e.g., with an account of the user) so that the virtual assistant may be utilized in a conversation user interface. In other instances, this may include at least partially downloading the virtual assistant to a client device (e.g., the smart device 104).

Figure 16:
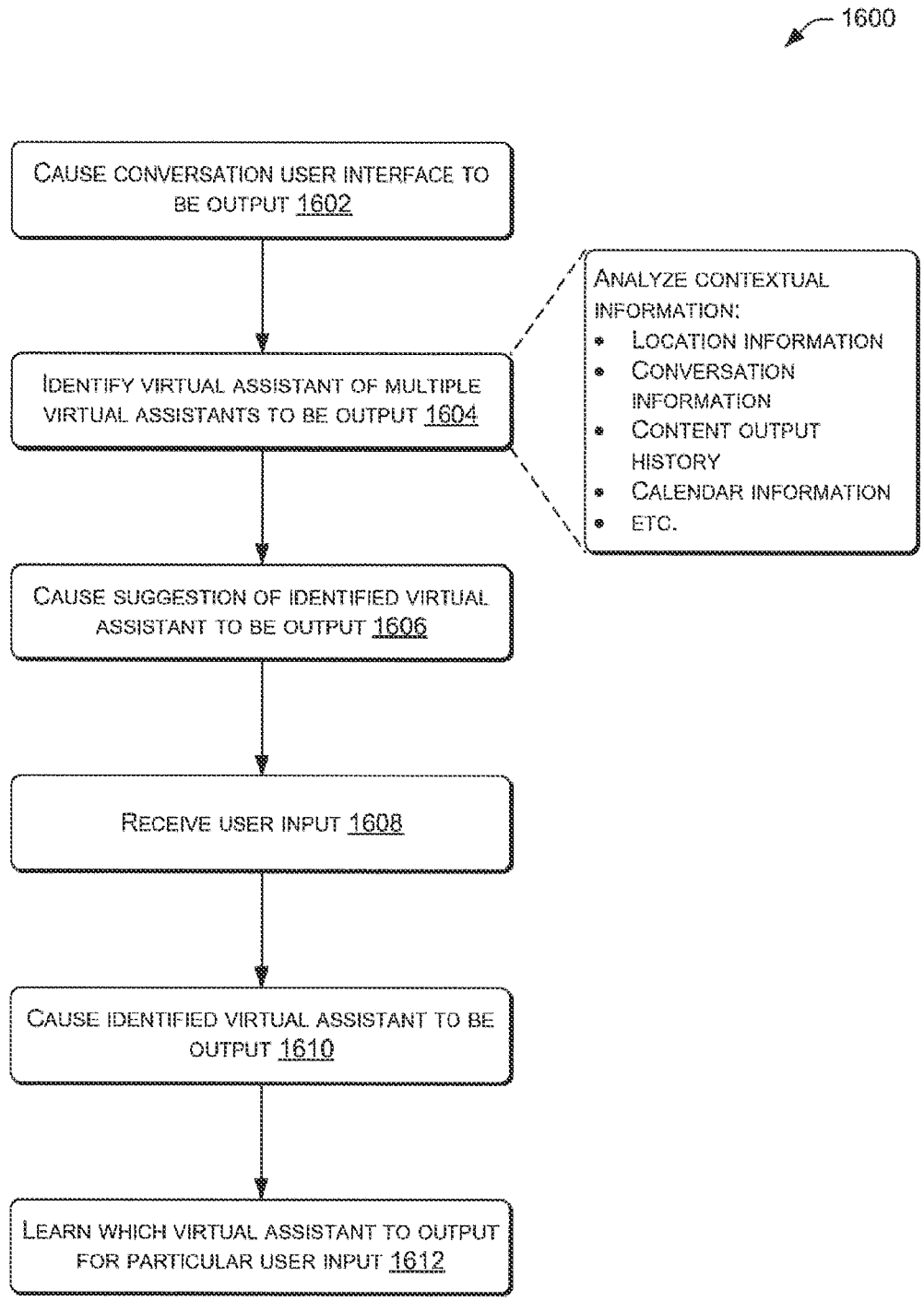
FIG. 16 illustrates an example process for outputting different virtual assistants via a conversation user interface.

FIG. 16 illustrates the example process 1600 for outputting different virtual assistants via a conversation user interface.

At 1602, a conversation user interface may be caused to be output. This may include sending an instruction to a client device (e.g., the smart device 104) to output the conversation user interface, displaying the conversation user interface, and so on. The conversation user interface may be output along with a virtual assistant from a team of virtual assistants. In some instances, a predetermined virtual assistant may be provided when the conversation user interface is initiated (e.g., opened by a user). The predetermined virtual assistant may be set by a user. Alternatively, or additionally, the predetermined virtual assistant may comprise a dispatching virtual assistant (e.g., executive assistant) that is configured to dispatch a conversation among the team of virtual assistants to a virtual assistant that is configured to perform a task related to a current context of the conversation.

The conversation user interface may enable or facilitate a conversation between a user and any number of virtual assistants from the team of virtual assistants. As noted above, a team of virtual assistants may include different characteristics, such as different task mappings, different base language models, different types of functionality, different visual appearances, different audible manners of output, different levels of security, different levels of training, different languages in which the multiple virtual assistants communicate, and so on.

At 1604, a virtual assistant of the team of virtual assistants may be identified to be output via the conversation user interface. In some instances, this may include identifying a new virtual assistant to output to replace an existing virtual assistant that is being presented. Here, the new virtual assistant may include different characteristics than the existing virtual assistant. In other instances, such as when the conversation user interface is initiated (e.g., opened by a user), this may include identifying a virtual assistant to be output when the conversation user interface is initiated.

A virtual assistant may be identified at 1604 by obtaining and analyzing contextual information related to a user or a smart device of the user (e.g., a context of the user or the smart device). For example, conversation information may be analyzed to determine a concept or identify input of a current or previous conversation between a user and a virtual assistant. Here, a virtual assistant may be selected that is configured to perform a task that is related to the concept or input of the conversation (e.g., identify a finance virtual assistant when the user mentions "ATM" or other term that is related to banking). In another example, location information may be analyzed to determine a location of a smart device that is used by a user (e.g., current, future/destination, or previous geo-location). Here, a virtual assistant may be selected that is configured to perform a task that is related to the location (e.g., selecting a travel virtual assistant when the user arrives at an airport). In yet another example, content output history describing content that has been output to a user may be analyzed to identify content that has been output. This may include content that has been output during a conversation (e.g., search results provided by a virtual assistant), content that has been output at another time (e.g., the user recently watched a new vampire movie), content that has been output on another smart device other than the one that is being used to communicated with the virtual assistant (e.g., a show that was recently watched on a television), and so on. Here, a virtual assistant may be selected that is configured to perform a task that is related to the content that has been output (e.g., select an entertainment virtual assistant when the user is watching a movie on a television and accesses a conversation user interface on a mobile telephone). In a further example, calendar information may be analyzed to identify an event, and a virtual assistant that is configured to perform a task that is related to the event may be selected (e.g., selecting a medical virtual assistant when a calendar indicates that a user has an appointment with a doctor). In another example, an orientation of a smart device may be determined (e.g., based on a sensor) and a virtual assistant that is configured to be displayed when the smart device is oriented according to the current orientation may be selected (e.g., presenting a virtual assistant that has a relatively large image, or that is previously identified by the user, when the smart device is oriented in landscape mode).

Moreover, in other examples at the operation 1604 other contextual information may be analyzed and other types of virtual assistants may be identified for output through the conversation user interface. For instance, the techniques may identify a virtual assistant has some relation to content of a message based on messaging information (e.g., identify a mechanic virtual assistant when a user describes a problem with a car in an email, text message, telephone call, instant message, etc.), identify a virtual assistant that has some relation to content that has been viewed or posted via a social networking service based on social networking information, identify a virtual assistant that has some relation to search input (e.g., identifying a mechanic virtual assistant when a user searches for mechanics), identify a virtual assistant that is configured to perform a task that has been performed previously at a current time of day (e.g., identifying a chef virtual assistant for output at 5 pm based on requests from a user on previous days around 5 pm for cooking recipes), and so on.

At 1606, a suggestion of the virtual assistant that has been identified at the operation 1604 may be caused to be output. The suggestion may recommend that the user converse with the identified virtual assistant through the conversation user interface (e.g., suggest that the user select the identified virtual assistant to initiate or continue a conversation).

At 1608, user input may be received that includes a selection of the identified virtual assistant (e.g., the user may select the identified virtual assistant for output). Here, the user input may be provided through the conversation user interface, such as when the user selects an icon or other information in the conversation user interface that represents the suggestion.

At 1610, the identified virtual assistant may be caused to be output to the user (e.g., displayed or otherwise output). This may include sending an instruction to a smart device to display the virtual assistant that is identified at the operation 1604, displaying the virtual assistant that is identified via a display of the smart device, and so on. In some instances, the identified virtual assistant may be output in response to receiving the user input at the operation 1608. In other instances, such as in cases where suggestions of virtual assistants are not made to users, the identified virtual assistant may be automatically output in response to performing the operation 1604. When a user is interacting with an initial virtual assistant through the conversation user interface, the operation 1610 may enable the user to continue a conversation with the identified virtual assistant that is now output. The newly presented virtual assistant may assist the user in completing a task that was previously requested with the initial virtual assistant or perform a variety of other functionality.

At 1612, information may be learned, including which virtual assistant to output for particular user input. For example, if it was determined to switch to a sports virtual assistant when a user mentions "rebounds" a particular number of times, and the user continues to converse with the sports virtual assistant after the switch, then it may be determined that this switch should be performed in the future when such a condition is met again. In contrast, if the user reverted to the initial virtual assistant after the sports virtual assistant was provided, then it may be determined that the switch should not be performed in the future.

Figure 17:
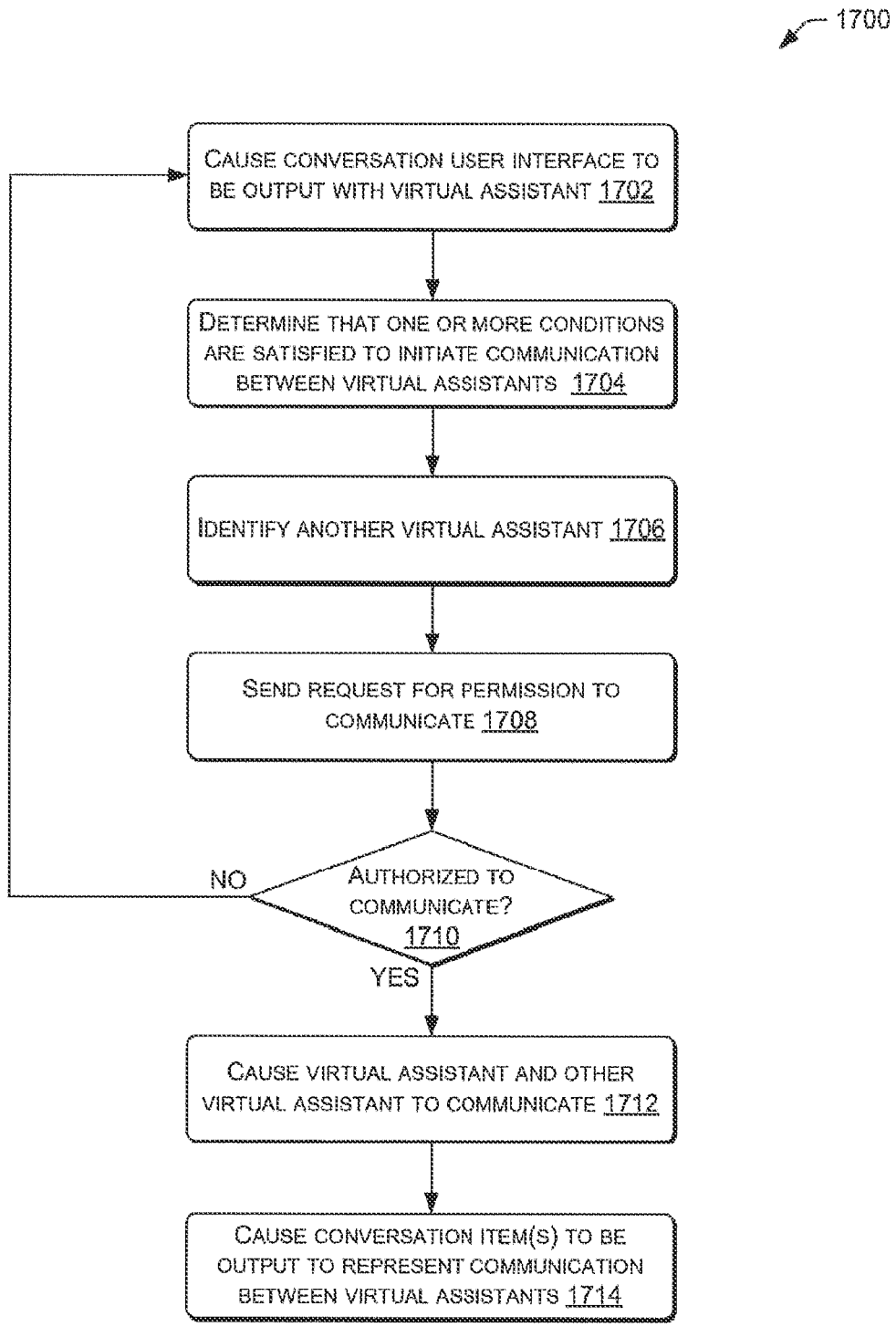
FIG. 17 illustrates an example process for enabling virtual assistants to communicate with each other and presenting information to represent the communication.

FIG. 17 illustrates the example process 1700 for enabling virtual assistants to communicate with each other and presenting information to represent the communication.

At 1702, a conversation user interface may be caused to be output along with a virtual assistant. The virtual assistant may be configured with particular characteristics, such as being associated with a particular entity (e.g., a user, application, company, service provider, device, etc.), include particular functionality, and so on. Further, in some instances the virtual assistant may be associated with a team of virtual assistants.

At 1704, it may be determined that one or more conditions are satisfied to initiate communication between virtual assistants (e.g., between the virtual assistant and another virtual assistant). The virtual assistants may have different characteristics, such as being associated with different entities, include different functionality, and so on, thereby enabling different tasks to be performed. The determination may be based on contextual information (e.g., conversation information, location information, etc.). The one or more conditions may generally be satisfied when it is determined that the virtual assistant that is currently being output lacks a characteristic that is needed to complete a task and/or determined that another virtual assistant has a more appropriate characteristic (e.g., is able to perform a task faster or more efficiently). To illustrate, if John is conversing with an executive assistant virtual assistant and requests "schedule a meeting with Linda," then it may be determined that a communication with one of Linda's virtual assistants is needed, since the executive assistant virtual assistant may not be associated with Linda (e.g., different entities). In another illustration, if a user asks a travel virtual assistant to purchase a flight and credit card information is needed, it may be determined that a communication with the user's banking virtual assistant is need, since the travel virtual assistant may not have access to the credit card information (e.g., different functionality).

At 1706, another virtual assistant may be identified to communicate with the virtual assistant that is currently output via the conversation user interface. For example, if it is determined that a communication is needed with a virtual assistant of a different entity than the entity that is associated with the currently output virtual assistant (e.g., John's virtual assistant needs to communicate with Linda's virtual assistant), then information may be referenced to identify which virtual assistants are associated with the other entity. In another example, if it is determined that a communication is needed with a virtual assistant that includes different functionality than a currently output virtual assistant, then it may be determined which virtual assistant is configured to perform the desired functionality (e.g., determine that a banking virtual assistant is needed to obtain credit card information).

At 1708, a request may be sent to the other virtual assistant that is identified at the operation 1706 for permission to communicate with the other virtual assistant. For example, when the other virtual assistant is associated with another user, a request may be sent to the other virtual assistant requesting that the other user authorize communication.

At 1710, it may be determined whether or not the virtual assistant is authorized to communicate with the other virtual assistant. For example, if authorization is received from the other user associated with the other virtual assistant, then it may be determined that the virtual assistant is authorized to communicate with the other virtual assistant. In contrast, if authorization is not received, then it may be determined that the virtual assistant is not authorized to communicate with the other virtual assistant.

If it is determined at 1710 that the virtual assistant is authorized to communicate with the other virtual assistant, the process 1700 may proceed to 1712 (e.g., the YES path). Alternatively, if it is determined that the virtual assistant is not authorized to communicate with the other virtual assistant, the process 1700 may return to 1702.

At 1712, the virtual assistant and the other virtual assistant may be caused to communicate (e.g., carry out a conversation). The communication may include exchanging information, providing responses and/or queries, and so on. In some instances, the virtual assistants may communicate to perform a task for the user.

At 1714, one or more conversation items may be caused to be output via the conversation user interface to represent the communication between the virtual assistants. In one example, a conversation item may include a dialog representation representing a response or query of a virtual assistant or other information that is communicated between the virtual assistants. This information may be related to functionality of a virtual assistant (e.g., a security virtual assistant may pass login and password information to an email virtual assistant that is attempting to access an email account, a music virtual assistant may pass a song to an executive assistant virtual assistant to be included as part of an appointment alert, etc.). In another example, a conversation item may include a summary item that represents an entirety or portion of the conversation between the virtual assistants (e.g., an icon that represents a number of back-and-forth communications and that, upon selection, may reveal those underlying communications). In yet another example, a conversation item may indicate that the task has been completed (e.g., an icon for a calendar event that has been scheduled, an icon for a flight that has been booked, and so on).

In some instances, the one or more conversation items may be presented over a period of time in a back-and-forth manner to emulate a human conversation (e.g., one virtual assistant speaks, then other speaks after waiting some time). For example, a first conversation item that is associated with a virtual assistant may be displayed via the conversation user interface and, after a period of time has passed from displaying the first conversation item, a second conversation item that is associated with another virtual assistant may be displayed. The conversation items may be displayed as information is exchanged between the virtual assistants or may be displayed independently of when information is exchanged.

Figure 18:
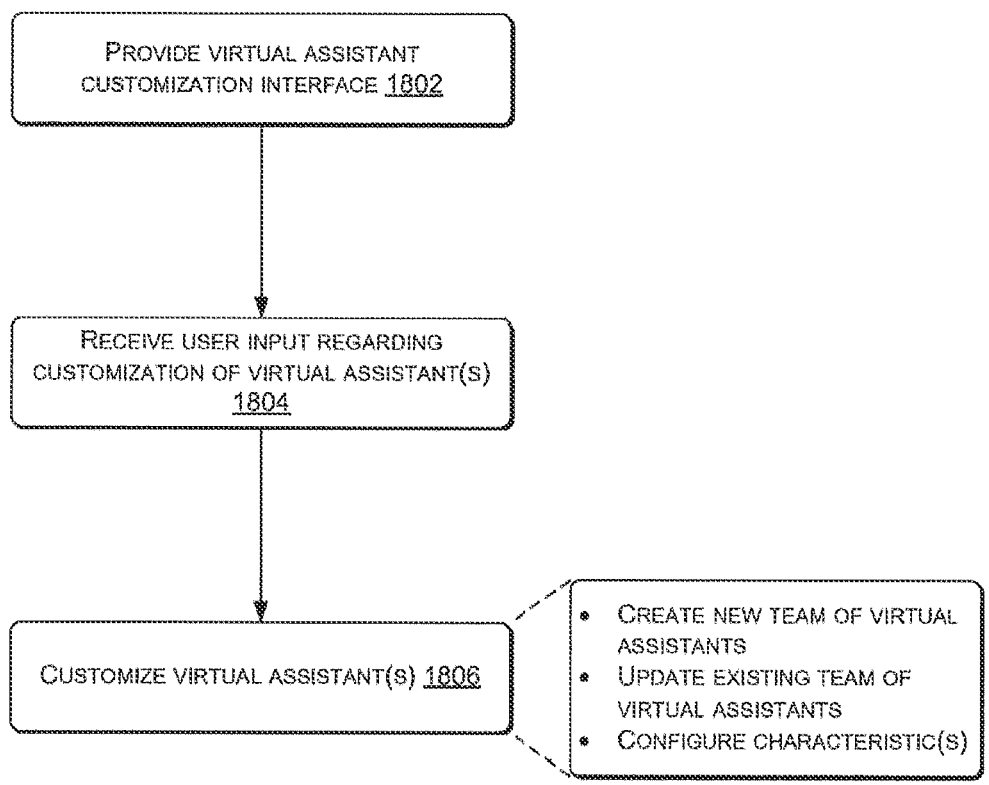
FIG. 18 illustrates an example process for customizing a team of virtual assistants through a virtual assistant customization interface.

FIG. 18 illustrates the example process 1800 for customizing a team of virtual assistants through a virtual assistant customization interface. In some instances, the process 1800 may enable end-users and others to customize virtual assistants.

At 1802, a virtual assistant team customization interface may be provided. The virtual assistant team customization interface may be provided to a user or others and may include a plurality of virtual assistants that are configured with different characteristics.

At 1804, user input may be received via the virtual assistant team customization interface regarding customization of a virtual assistant of the plurality of virtual assistants. For example, the user input may identify a virtual assistant to be added to or removed from a team of virtual assistants that are associated with the user. Here, the user input may include a drag-and-drop action where a virtual assistant is dragged to or away from a team icon representing the team of virtual assistants. In another example, the user input may related to customization of a characteristic of a virtual assistant (e.g., a request to change a task mapping, a selection of an image to represent a visual appearance of a virtual assistant, a request to set a condition that triggers the output of a virtual assistant, etc.).

At 1806, one or more virtual assistants may be customized based on the user input that is received at 1804. For example, a new team of virtual assistants may be created and associated with a user or smart device based on user input that identifies what virtual assistants to include in the team. In another example, an existing team of virtual assistants may be updated to add or remove a virtual assistant that is identified from user input. In yet another example, a characteristic of a virtual assistant may be configured, such as a visual appearance of a virtual assistant, a condition that triggers when a virtual assistant is output, a task mapping, and so on.

Figure 19:
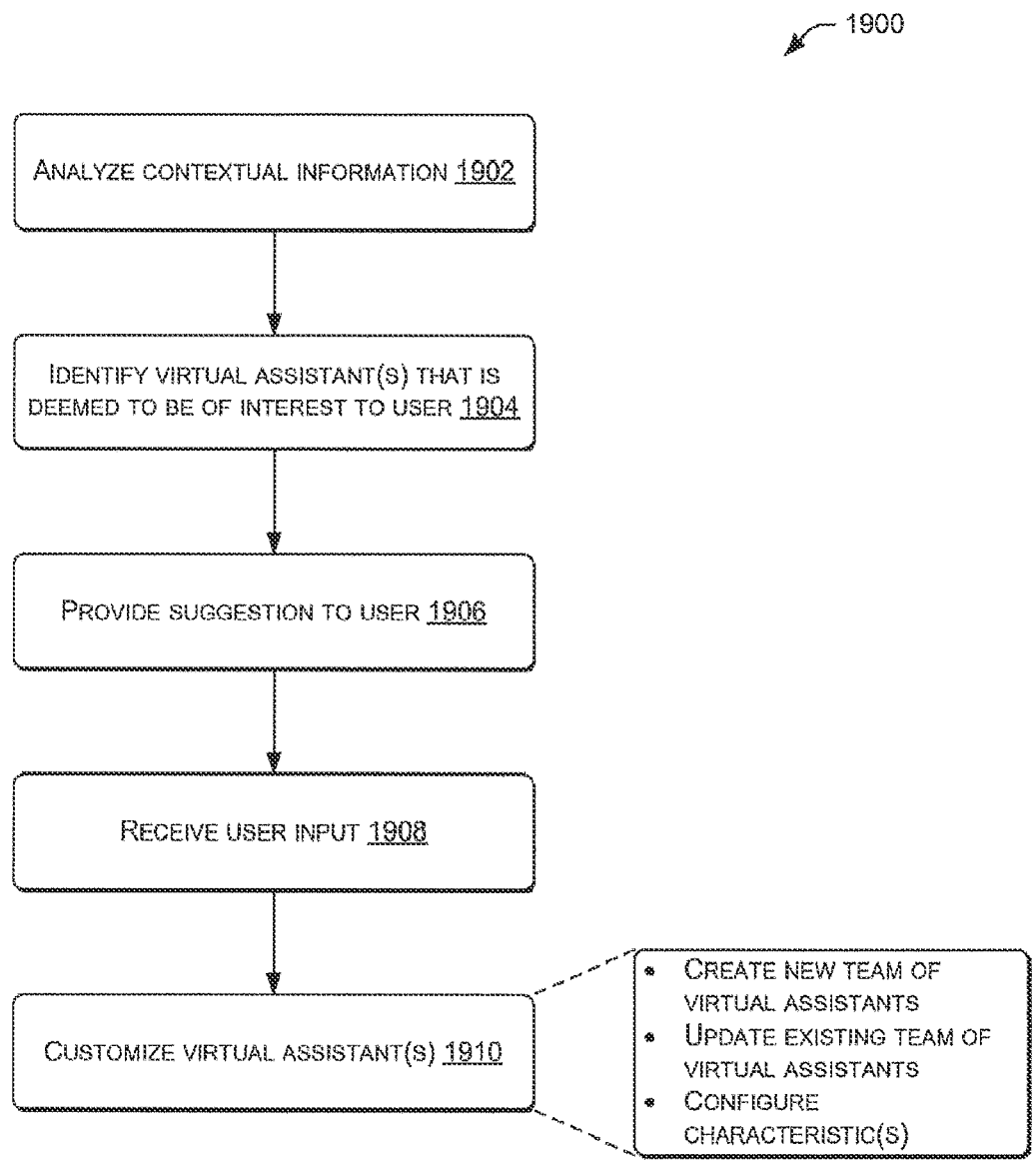
FIG. 19 illustrates an example process for customizing a team of virtual assistants from an analysis of contextual information.

FIG. 19 illustrates the example process 1900 for customizing a team of virtual assistants from an analysis of contextual information. In some instances, the process 1900 may customize a team of virtual assistants to include virtual assistants that may be of interest to a user.

At 1902, contextual information may be analyzed to identify one or more tasks that are deemed to be of interest to a user. The contextual information may comprise, for example, conversation information, content output history, calendar information, location information, preference information, or any other type of information. The one or more tasks that are deemed to be of interest may be identified in a variety of manners. For example, if a user has asked more than a particular number of medical questions over a period of time, then it may be determined that the user may be interested in having medical-related tasks performed (e.g., answering medical diagnostic questions, setting doctor appointments, reminding the user when to take prescriptions, etc.). In another example, if a user frequently views a sports website, then it may be determined that the user is interested in having sports tasks performed (e.g., providing sports scores, purchasing tickets to sports games, etc.).

At 1904, one or more virtual assistants that are deemed to be of interest to a user may be identified. This may be based on the analysis at 1902. For example, a virtual assistant that is configured to perform a task that is deemed to be of interest to a user may be identified (e.g., identify a sports virtual assistant when it is determined that the user is interested in sports tasks).

At 1906, a suggestion may be provided to a user identifying a virtual assistant that is identified at 1904. The suggestion may recommend that the user add the virtual assistant to a team of virtual assistants that are associated with the user. The suggestion may be provided through a conversation user interface, a virtual assistant agency interface, a virtual assistant team customization interface, or otherwise.

At 1908, user input may be received that includes a selection of the suggested virtual assistant. That is, the user may indicate a desire to include the suggested virtual assistant in a team of virtual assistants.

At 1910, one or more virtual assistants may be customized. The customizing may include updating a team of virtual assistants to include a virtual assistant that is configured to perform a task that is deemed to be of interest to a user (e.g., automatically creating a new team of virtual assistants to include a virtual assistant that is deemed to be of interest, automatically updating an existing team of virtual assistants to include a virtual assistant that is deemed to be of interest, etc.), configuring a characteristic of a virtual assistant, and so on. To illustrate, a team of virtual assistants that is associated with a user may be updated to include a virtual assistant that is configured to perform a task that is related to contextual information of the user, such as adding a sports virtual assistant when conversation information indicates that the user frequently (e.g., more than a threshold number of times over a period of time) asks that sports tasks be performed, adding a movie virtual assistant when content output history indicates that the user frequently views movies, adding a medical virtual assistant when calendar information indicates that the user frequently goes to the doctor, adding a restaurant virtual assistant when location information indicates that a user frequently goes to restaurants, adding a handyman virtual assistant when preference information indicates that the user likes to build things, and so on.

Although the operations 1906 and 1908 are illustrated as being included in the process 1900, in some instances these operations may be omitted, such as in the case when an automatic customization is performed based on contextual information.

Figure 20:
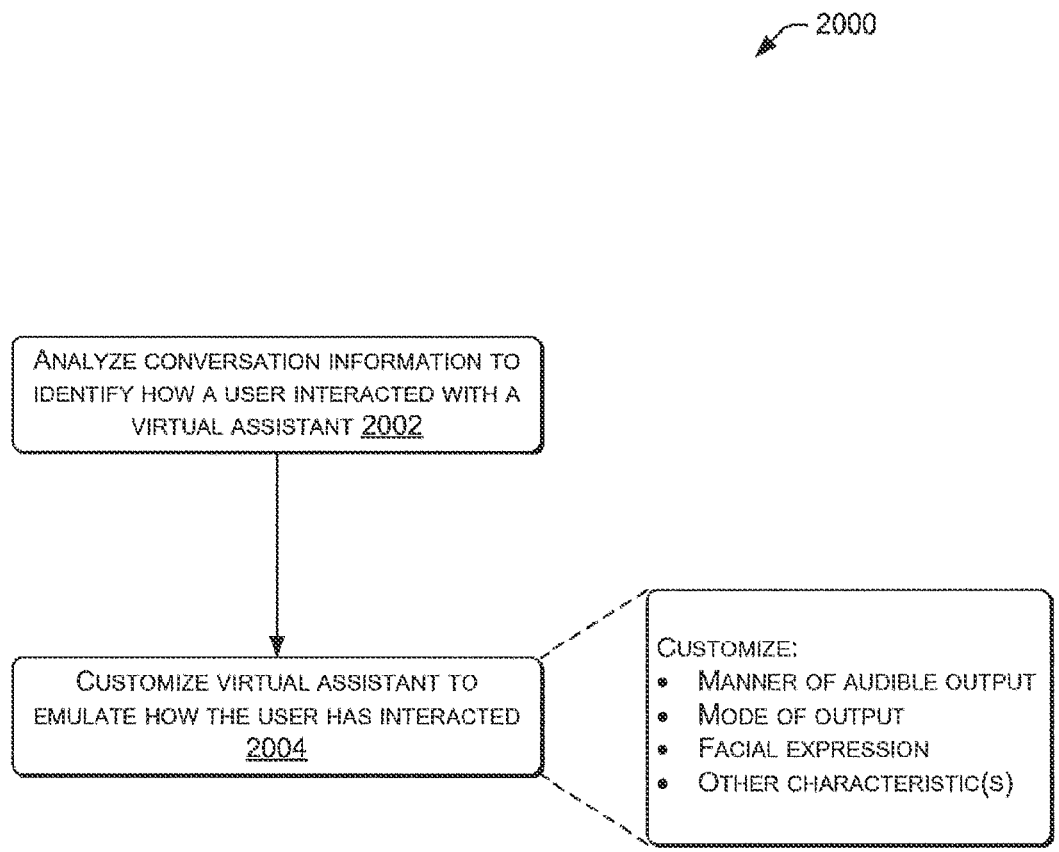
FIG. 20 illustrates an example process for customizing a virtual assistant to emulate how a user has interacted with the virtual assistant.

FIG. 20 illustrates the example process 2000 for customizing a virtual assistant to emulate how a user has interacted with the virtual assistant.

At 2002, conversation information may be analyzed to identify how a user has interacted with a virtual assistant during a conversation. The conversation information may generally describe a conversation between the virtual assistant and the user. In some instances, the conversation information may include images that were captured during the conversation with the user (e.g., images of facial expressions of the user). The images may be captured with the users consent. The analysis at 2002 may include identifying a manner of speech that the user used during the conversation, a mode of input that the user has used more than a threshold number of times during the conversation (e.g., text, touch, or speech), one or more facial expressions that were expressed by the user during the conversation, and so on.

At 2004, a virtual assistant may be customized to emulate how the user interacted with the virtual assistant during a conversation. The virtual assistant that is customized may include the same or a different virtual assistant than that with which the user interacted. In one example, the virtual assistant may be customized by configuring a manner of audible output of the virtual assistant based on the manner of speech that the user used during a conversation (e.g., configuring the virtual assistant to talk slow when the user talks slow, configuring the virtual assistant to have a same accent as the user, configuring the virtual assistant to use acronyms when the user uses acronyms, and so on). In another example, a mode of output of the virtual assistant may be customized based on a mode of input of the user (e.g., use text/content output when the users uses text input, use audio output when the user uses speech input, and so on). In yet another example, a facial expression that is expressed by a virtual assistant may be customized based on a facial expression that was expressed by a user (e.g., the virtual assistant may smile frequently when the user smiles frequently, the virtual assistant may raise eyebrows when the user raises his eyebrows, etc.). In other examples, other characteristics of a virtual assistant may be configured.

Figure 21:
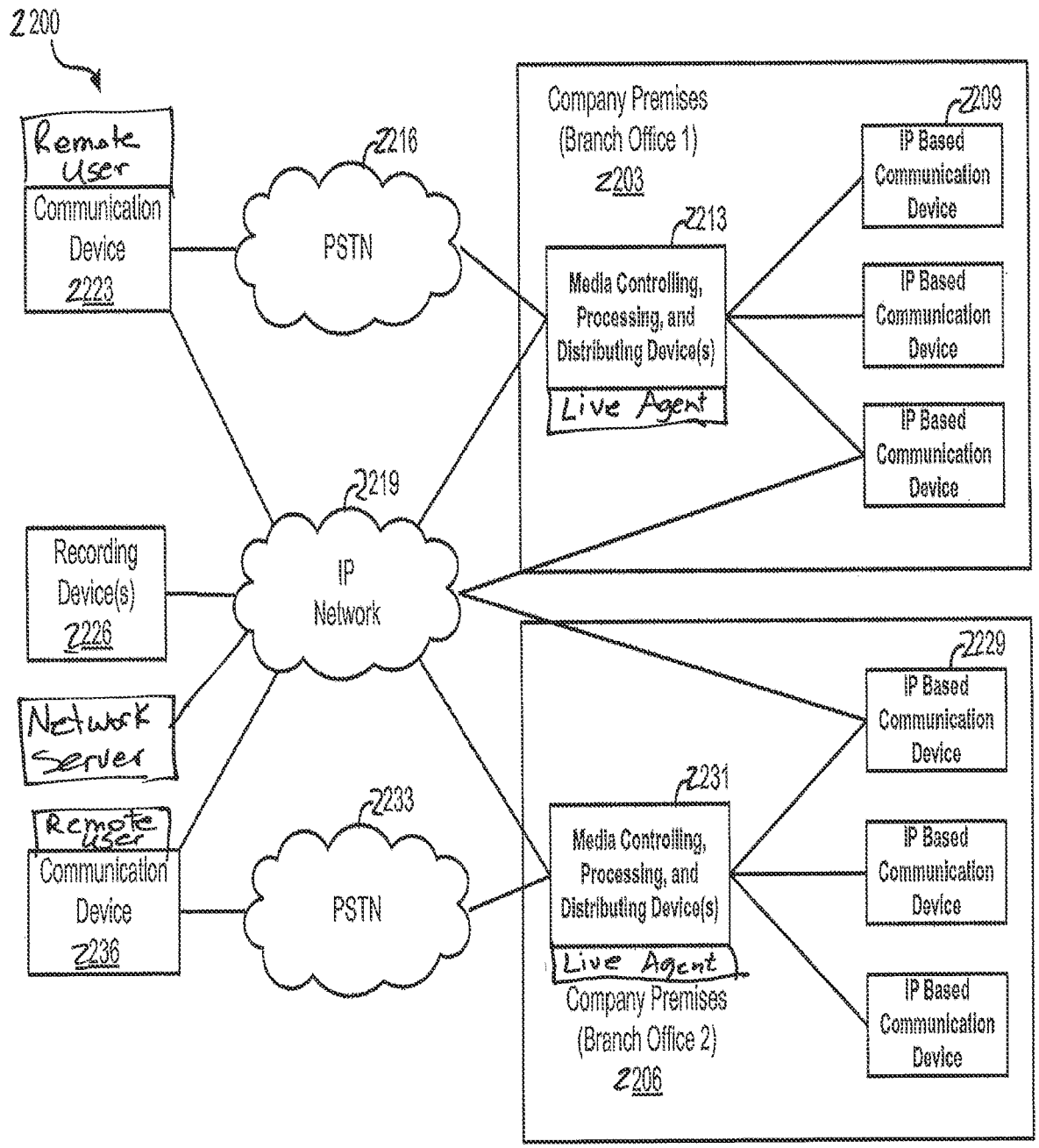
FIG. 21 is a schematic diagram of an embodiment of a system in which multimedia communication at a company can be recorded by an endpoint recorder located anywhere on an IP network connected to the company.

FIG. 21 illustrates example embodiments that may be used in achieving the goals of this disclosure. It is noteworthy that Customer communication devices 2223, 2236 connect to branch offices 2203, 2206 either via an IP network 2219 or via a PSTN network 2216, 2233, respectively. The customer communication devices 2223, 2236 can include, but are not limited to, telephones, soft-phones on hand held devices, personal computers, or any computerized device or system capable of retrieving, processing, and transmitting multimedia data across a network.

Figure 22:
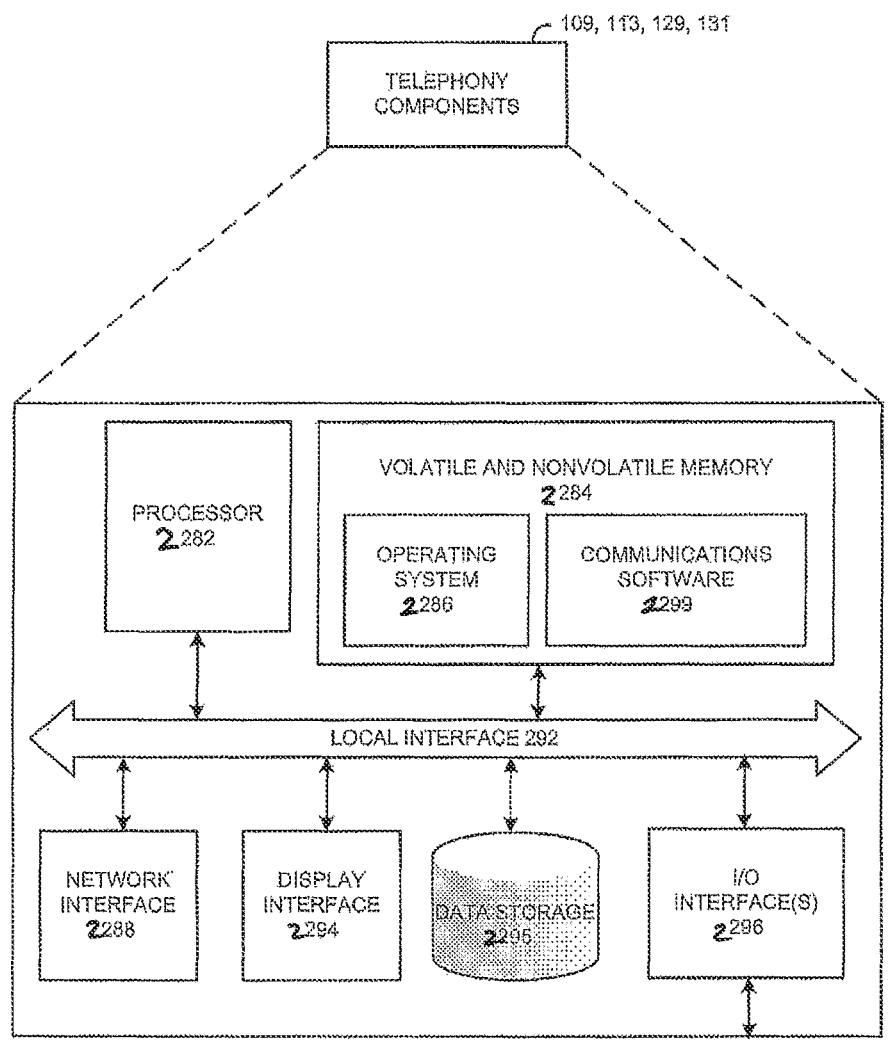
FIG. 22 is a schematic diagram of an embodiment of a system in which hardware architecture transmits and receives multimedia data via local interfaces in a network.

FIG. 22 illustrates that the media controlling/processing devices control the communication between customers and employees and between employees. The media controlling/processing devices can include, but are not limited to, multimedia gateways, soft switches, conference bridges, and multi-media application servers. The distributing devices can include, but are not limited to, routers and switches. Based on static configuration or instructions from the recording devices, the media controlling/processing devices can duplicate and transmit on-going communication between communication devices 2209, 2229, 2223, 2236 to the recording devices via the IP network 2219 using its multimedia processing features. Alternatively or additionally, the media controlling/processing devices can also instruct a communication device 2209, 2229 at the company premises 2203, 2206, respectively, to duplicate and transmit any on-going communications to the recording devices 2226 using media processing features on the communication devices 2209, 2229.

Figure 23:
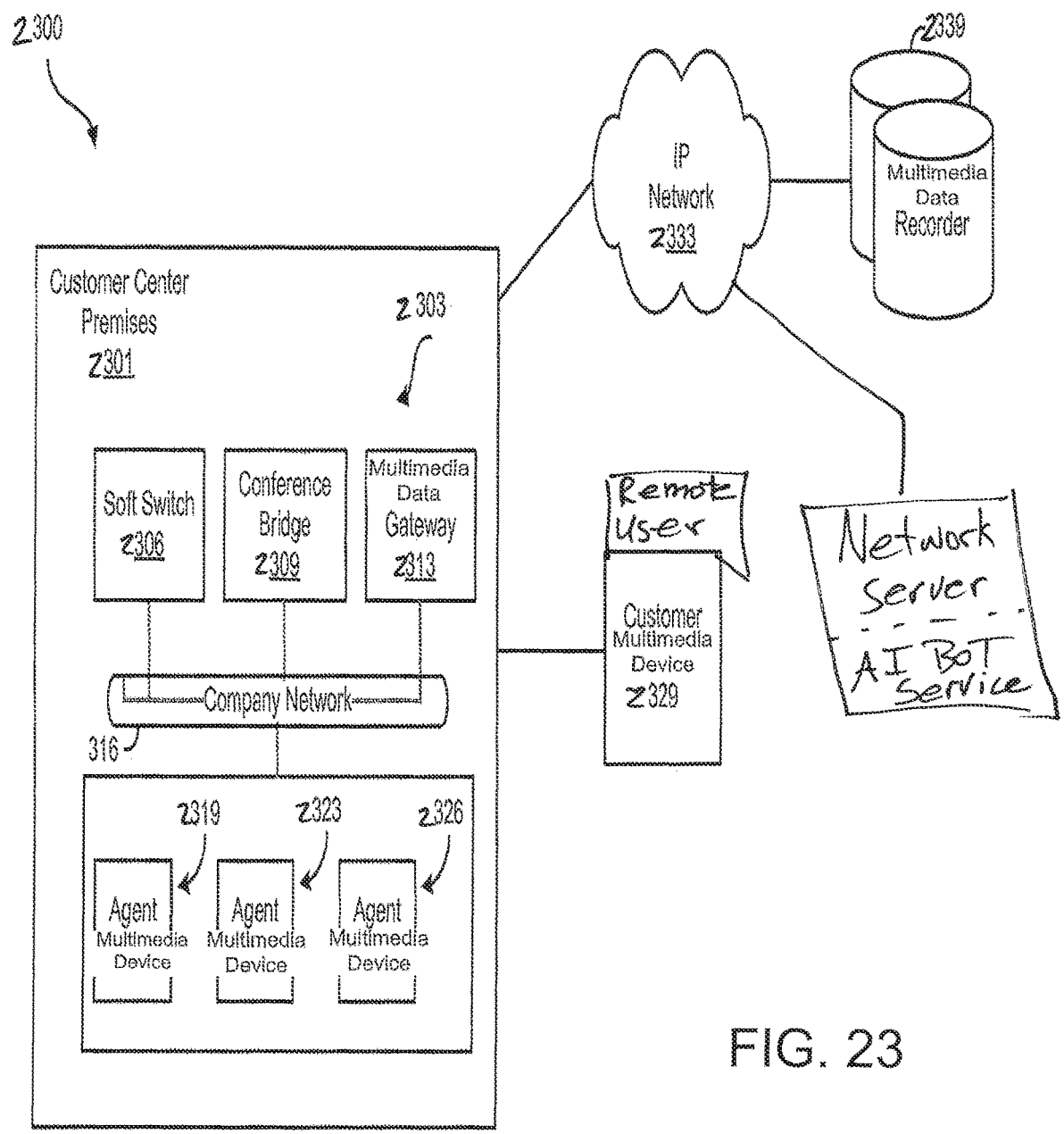
FIG. 23 is a schematic diagram of an embodiment of a system in which media communication at a contact center can be recorded by a multimedia endpoint recorder located anywhere on an IP network connected to the contact center using a conference bridge.

FIG. 23 is a schematic diagram of an embodiment of a system in which multimedia communication at a contact center can be recorded by an endpoint recorder located anywhere on an IP network connected to the contact center using a conference bridge. The endpoint recorder is configured for receiving, processing, and storing all kinds of multimedia data, with examples shown in the figures as audio/voice, video, and screen shots or screen scraping data. As indicated in this figure, the system 2300 comprises a contact center premises 2301 that includes an IP telephony system 2303 that enables communications between agent phones 2319, 2323, 2326 and between agent phones and customer phone(s) 2329. Use of the term "phones" includes all types and configurations of computerized devices operating as communication devices, including but not limited to computers fitted with two-way live communication cameras and computer implemented telephony. The IP telephony system 2303 includes soft switch 2306, conference bridge 2309, voice gateway 2313 and agent phones 2319, 2323, 2326, all of which are connected to a company network 2316. Calls from the customer phone 2329 can be routed to a voice gateway 2313, which can route the calls to the soft switch 2306. The soft switch 2306 receives incoming calls and routes the calls to the agent phones 2319, 2323, 2326. The soft switch 2306 communicates with the conference bridge 2309 via the company network 2316. The IP telephony system 2303 communicates with a voice endpoint recorder 2339 via an IP network 2333. The company network 2316 and IP network 2333 can include, but are not limited to, a wide area network (WAN), a local area network (LAN), a virtual private network (VPN) and the Internet.

In this embodiment, the soft switch 2306 is operative to send a command to the agent phones 2319, 2323, 2326 and voice gateway 2306 via the company network 2316, instructing the agent phones 2319, 2323, 2326 and voice gateway 2306 to transmit media communications associated with the incoming calls through the conference bridge 2309 via the company network 2316. The soft switch 2306 also sends a command to the conference bridge 2309 via the company network 2316 to duplicate and transmit the media communication to the voice endpoint recorder 2339 using the IP network 2333.

In an embodiment, a system for providing virtual assistance in a customer-agent interaction includes at least one agent device configured to accommodate multi-directional communications over a network among the at least one agent device, a remote user device, and a network server. The network server includes computerized software that implements a human-machine interface with an artificial intelligence robot (i.e., an AI Bot) configured as a virtual-assistance agent. A communications conferencing channel on the network is simultaneously accessible by the at least one agent device, the remote user device, and the virtual assistance agent on the network server, wherein the communications conferencing channel accommodates multi-party interaction among a live agent, a remote user, and the virtual assistant agent. In particular and without limiting the disclosure to any single embodiment, the communications conferencing channel may be configured so that a live agent is in bi-directional communications with a remote user, such as a customer. During the bi-directional customer-agent interaction, the agent may call upon an AI Bot implemented on the network server. Because the remote user has access to the conferencing channel, the remote user can access any multimedia data on the conferencing channel, i.e., the remote user/customer may hear the live agent issuing voice commands to the AI Bot and hear the Bot's reply. Numerous programming techniques can be implemented on the network, such as within a gateway, to control which parties on the communications conference channel can have bi-directional communication. In a likely scenario, the live agent should have bi-directional communication with both the remoter user and the network server, but the remote user may be limited to bi-directional communication with the live agent but only one way communication (i.e., listening to audio) from the network server. The devices implemented herein may be audio, video, or multimedia kinds of user devices to implement the system herein. In one example, the communications conferencing channel comprises an audio data channel. The audio data channel transmits audio data to and from the live agent, the remote user, and the virtual assistant agent in a format that is commonly accessible and can be heard by both the live agent device and the remote user device simultaneously.

The audio data may include voice activated command data from the live agent to the virtual assistance agent implementing as an AI bot on the network server. The voice activated command data would be audible to the remote user during a transaction. A system according to this disclosure utilizes audio data as an audio output from the virtual assistance agent (i.e., the AI Bot) to the live agent, and the audio output can be audible to and accessible by the remote user via the communications conferencing channel.

In another implementation, the voice activated command data from the live agent comprises a trigger condition that is recognizable by the virtual assistance agent as a request for information, and in response to the trigger condition, the virtual assistance agent implemented as an online AI Bot, provides, from the server, relevant audio response data to the communications conferencing channel.

Given that the devices communicating on any network may be multimedia "smart" devices with text, audio, and video displays, the virtual assistance agent can also accesses another channel on the network to provide on-screen data (video and/or chat texting) via this other channel to the live agent computer. For example, the on-screen data instructs the live agent in regard to advice for assisting the remote user.

In another non-limiting embodiment, the conferencing communication channel transmits audio data that comprises voice activated command data from the live agent to the virtual assistant agent, and the voice activated command data is simultaneously audible to the remote user during a transaction, and wherein the server comprises a natural language processing service that converts the voice activated command data to machine language that comprises a trigger condition therein.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

The invention claimed is:

1. A system for providing virtual assistance in a customer-agent interaction, comprising:
at least one agent device configured to accommodate multi-directional communications over a network among the at least one agent device, a remote user device, and a network server;
the network server comprising computerized software that implements a human-machine interface with an artificial intelligence robot configured as a virtual assistance agent, wherein the virtual assistance agent is configured to determine a context associated with the customer-agent interaction and wherein the computerized software is configured to update a data store based on the context determined by the virtual assistance agent, wherein the data store stores characteristics of the user comprising at least a preference of the user;
a communications conferencing channel on the network that is simultaneously accessible by the at least one agent device, the remote user device, and the virtual assistance agent on the network server,
wherein the communications conferencing channel accommodates multi-party interaction among a live agent, a remote user, and the virtual assistance agent, and wherein the virtual assistance agent is configured to generate a response to a subsequent customer-agent interaction based on the characteristics of the user in the updated data store; and wherein the communications conferencing channel transmits audio data that comprises voice activated command data from the live agent to the virtual assistance agent, the voice activated command data being simultaneously audible to the remote user during a transaction, and wherein the server comprises a natural language processing service that converts the voice activated command data to machine language that comprises a trigger condition therein.

2. The system according to claim 1, wherein the communications conferencing channel comprises an audio data channel.

3. The system according to claim 2, wherein the audio data channel transmits audio data to and from the live agent, the remote user, and the virtual assistance agent in a format that is commonly accessible by both the live agent device and the remote user device simultaneously.

4. The system according to claim 3, wherein the audio data comprises voice activated command data from the live agent to the virtual assistance agent, said voice activated command data being audible to the remote user during a transaction.

5. The system according to claim 4, wherein the audio data comprises an audio output from the virtual assistance agent to the live agent, said audio output being audible to and accessible by the remote user via the communications conferencing channel.

6. The system according to claim 4, wherein the voice activated command data from the live agent comprises a trigger condition that is recognizable by the virtual assistance agent as a request for information, and in response to the trigger condition, the virtual assistance agent provides, from the server, relevant audio response data to the communications conferencing channel.

7. The system according to claim 6, wherein the virtual assistance agent accesses another channel to provide on-screen data to the live agent.

8. The system according to claim 7, wherein the on-screen data instructs the live agent in regard to advice for assisting the remote user.

9. The system according to claim 1, wherein the remote user accesses audio output data from the virtual assistance agent on the communications conferencing channel.

10. The system according to claim 1, wherein the remote user device comprises a video output display, and wherein the communications conferencing channel comprises a multimedia data channel.

11. The system according to claim 10, wherein the multimedia data channel transmits audio data and video data to and from the live agent, the remote user, and the virtual assistance agent in a format that is commonly accessible by both the live agent device and the remote user device simultaneously.

12. The system according to claim 11, wherein the audio data comprises voice activated command data from the live agent to the virtual assistance agent, said voice activated command data being audible to the remote user during a transaction.

13. The system according to claim 12, wherein the multimedia data channel further comprises multimedia output data from the virtual assistance that is accessible by both the live agent device and the remote user device.

14. The system according to claim 13, further comprising a recording system configured to store information from the multimedia data channel.

15. A system for providing virtual assistance in a customer-agent interaction, comprising:

at least one agent device configured to accommodate multi-directional communications over a network among the at least one agent device, a remote user device, and a network server;

the network server comprising computerized software that implements a human-machine interface with an artificial intelligence robot configured as a virtual assistance agent, wherein the virtual assistance agent is configured to determine a context associated with the customer-agent interaction and wherein the computerized software is configured to update a data store based on the context determined by the virtual assistance agent, wherein the data store stores characteristics of the user comprising at least a preference of the user;

a communications conferencing channel on the network that is simultaneously accessible by the at least one agent device, the remote user device, and the virtual assistance agent on the network server, wherein the communications conferencing channel accommodates multi-party interaction among a live agent, a remote user, and the virtual assistance agent, and wherein the virtual assistance agent is configured to generate a response to a subsequent customer-agent interaction based on the characteristics of the user in the updated data store; and wherein the communications conferencing channel transmits audio data that comprises voice activated command data from the live agent to the virtual assistance agent, the voice activated command data being simultaneously audible to the remote user during a transaction, and wherein the server comprises a natural language processing service that converts the voice activated command data to machine language that comprises a trigger condition therein;

a multimedia gateway connected on the network, wherein the multimedia gateway comprises telecommunications protocol programming to receive multimedia data from the network server, the agent device, and the remote user device, and wherein the multimedia gateway is further configured to identify and direct transmission of particular kinds of multimedia data to the network server, the agent device, and the remote user device.

16. The system according to claim 15, wherein the gateway disallows communication from the remote user device to the network server while simultaneously allowing communication to the remote user device from the network server and the agent device.

17. The system according to claim 16, wherein the communication between the agent device and the remote user device is bi-directional, the communication between the agent device and the network server is bi-directional, and the communication between the network server and remote user device is one-way only from the network server to the remote user device on the communications conferencing channel.

* * * * *